United States Patent [19]

Kamei et al.

[11] Patent Number: 5,587,801
[45] Date of Patent: Dec. 24, 1996

[54] DIGITAL IMAGE FORMING APPARATUS

[75] Inventors: Nobuo Kamei, Toyokawa; Yoshikazu Ikenoue, Toyohashi; Hideo Yamamoto, Hiratsuka, all of Japan

[73] Assignee: Minolta Camera Kabushiki Kaisha, Osaka, Japan

[21] Appl. No.: 595,940

[22] Filed: Feb. 6, 1996

Related U.S. Application Data

[63] Continuation of Ser. No. 78,464, Jun. 18, 1993, abandoned.

[30] Foreign Application Priority Data

Jun. 19, 1992 [JP] Japan .................................... 4-160793

[51] Int. Cl.$^6$ ........................................... H04N 1/10
[52] U.S. Cl. .......................... 358/296; 358/444; 358/404
[58] Field of Search .................................. 358/444, 443, 358/404, 296

[56] References Cited

U.S. PATENT DOCUMENTS

| | | | |
|---|---|---|---|
| 4,315,684 | 2/1982 | Sugiura et al. | 355/14 R |
| 4,866,536 | 9/1989 | Honjo et al. | 358/443 |
| 5,227,909 | 7/1993 | Watson . | |
| 5,278,785 | 1/1994 | Hazani | 365/182 |

FOREIGN PATENT DOCUMENTS 60-190069  9/1985  Japan .

Primary Examiner—Valerie A. Lund
Attorney, Agent, or Firm—Burns, Doane, Swecker & Mathis, LLP

[57] ABSTRACT

In a digital copying apparatus, the digital image data of a document to be copied are stored in a memory means, and an image is copied on a paper according to the digital image data stored in the memory means. Two clear modes are provided for clearing the image data stored in the memory means. In the first clear mode, the data in the memory means is cleared when the document is detected to be removed from the platen and the like. In the second clear mode, the data in the memory means is cleared when a new document is detected to be set on the platen glass or the like. One of the two clear modes is selected with the operational panel and the selected mode is displayed. A memory clear command is sent to the memory means at an appropriate timing in the two clear modes, and the memory clear is executed by the memory means. The memory clear command is sent only after the copying operation is completed or it is inhibited to clear the image data when a latent image is being formed according to the image data.

24 Claims, 23 Drawing Sheets

DIGITAL IMAGE FORMING APPARATUS

This application is a continuation of application Ser. No. 08/078,464, filed Jun. 18, 1993, now abandoned.

BACKGROUND OF THE INVENTION

1. Field of the Invention

The present invention relates to a digital image forming apparatus such as a digital copying machine wherein an image data can be stored in a memory.

2. Description of the Prior Art

There is known a digital copying machine which can store a digital image data of a document image obtained by an image reader and can produce a copy with use of the digital image data. In such a digital copying machine, because a digital image data of a document has been read and stored in a memory, when the same document is copied again, the read action is not need at the second copy and after.

However, a memory for storing digital image data has a limited memory capacity. Therefore, the timing of data clear is a problem when image data is stored fully in the memory.

In order to solve this problem, it is proposed to clear the image data stored in a memory after the copying action completes normally. Further, it is also proposed to clear the image data stored in a memory when a certain time passes after the completion of the copying action. However, in the two methods, when the same document is copied for example after the certain time passes, it is needed to read image data of the document again.

Further, it is also proposed to clear image data stored in a memory after a certain time passes from the time of data storage by using a clock provided in the copying machine. However, this approach needs a large capacity of memory to enhance the cost.

SUMMARY OF THE INVENTION

An object of the present invention is to provide a digital copying machine wherein a memory for storing digital image data can be used more effectively.

In a digital image forming apparatus such as a digital copying machine, a document is set and read at a predetermined position and the digital image data are stored in a memory means. Then, a copy of the document is produced according to the digital image data stored in the memory means. In one aspect of the present invention, a document at the predetermined position is detected with a detection means, and the digital image data stored in the memory means are cleared when the document is detected to be removed from the position. In a second aspect of the present invention, when the document is detected to be removed and a new document is placed at the predetermined position, the digital image data stored in the memory means are cleared.

An advantage of the present invention is that when the same document is copied successively, the read action is not needed further because the image data of the document is stored in the memory means.

Another advantage of the present invention is that an erroneous memory clear of the image data of a document can be prevented because the image data is cleared only after the removal of the document is detected.

A further advantage of the present invention is that an erroneous copy is not produced because no image data on previous documents remains in the memory means.

A still further advantage of the present invention is that because digital image data of a document is stored until a next document is placed on a platen, the same document can be copied again for a long time.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
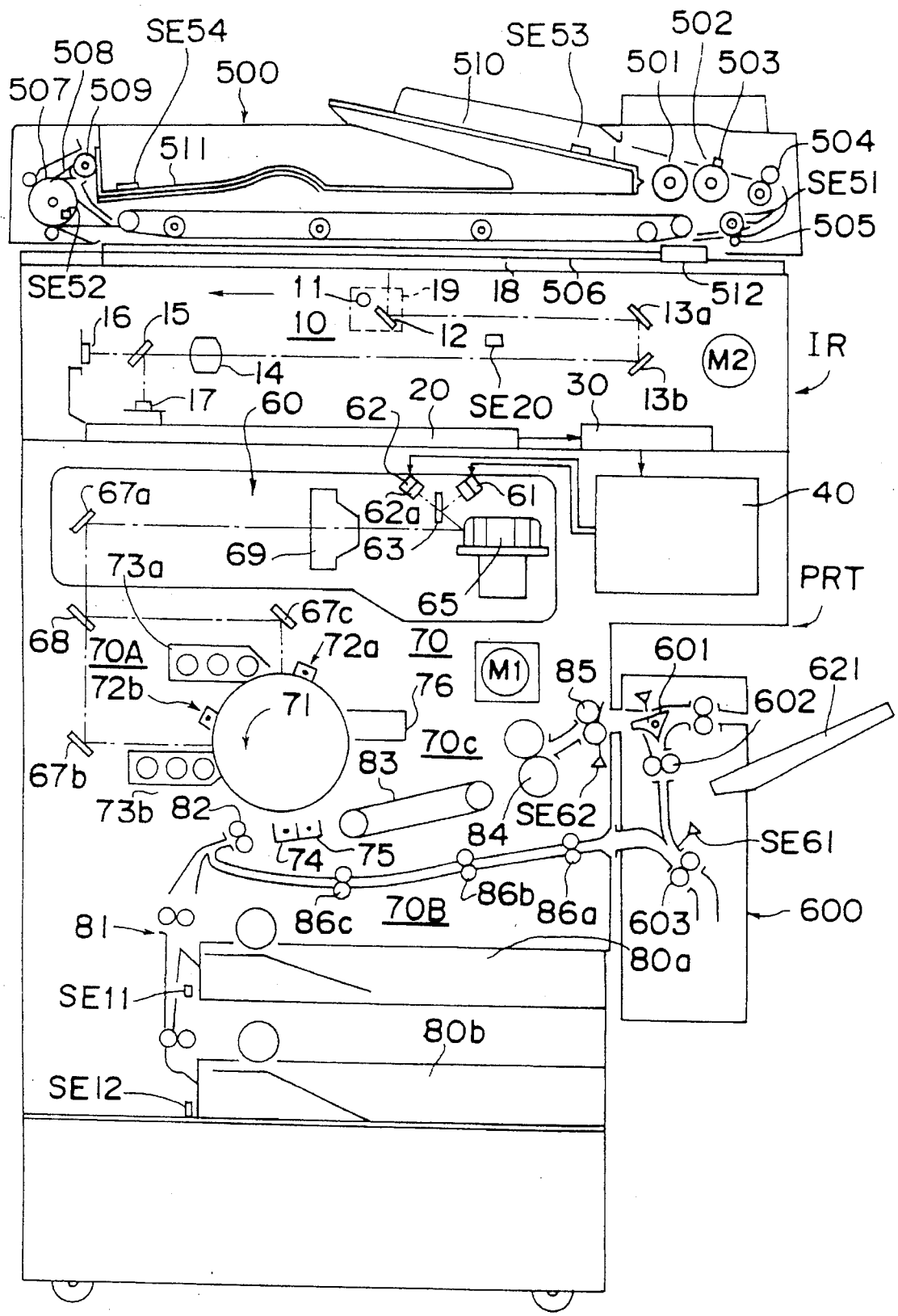
FIG. 1 is a sectional front view of a digital copying machine.

Referring now to the drawings, wherein like reference characters designate like or corresponding parts throughout the drawings, embodiments of the present invention will be explained below. FIG. 1 shows a digital copying apparatus, wherein an image reader (IR) comprises a scan system 10, an image signal processor 20 (not shown) and a memory unit 30.

The scan system 10 reads an image of a document placed on a platen glass 18 and performs the photoelectric conversion of the optical image to digital image data. In the scan system 10, an exposure lamp 11 and a first mirror 12 are mounted on a slider 19 which moves below the platen glass 18 by a scan motor M2. The light emitted from the lamp 11 illuminated a document on the platen glass 18 and the light reflected from the document is reflected by the first mirror 12, a second mirror 13a and a third mirror 13b, and it is converged by a lens 14. Then, the light transmits a dichroic mirror 15 so that a specified color such as red is reflected while the complement of the specified color is transmitted. The two beams passing the dichroic mirror 15 are received by two photoelectric conversion elements 16, 17 such as CCDs. That is, the photoelectric conversion elements 16, 17 convert optical images of the specified color (second color) such as red and the other color (first color) such as black to electric signals, respectively, for example for an image of red and black. The scan system 10 also comprises a sensor SE20 for detecting a document placed on the platen glass 18.

A document feeder 500 feeds a document to the platen glass 18 and if necessary reverses the document. The document feeder 500 is mounted with a hinge connection on the platen glass 18, so that it can open a space for placing a document on the platen glass 18 directly. That is, a document can be placed on the platen glass 18 directly by or indirectly with the document feeder 500. If the document feeder 500 is not used, a user places and removes a document manually. When the document feeder 500 is used, documents are supplied to and removed from the platen glass 18 automatically.

In the document feeder 500, documents can be put on a paper feed tray 510 with their faces up. A sensor SE53 detects a document on the paper feed tray 510. When reading starts, a document is fed by a feed roller 501 from the bottom side successively. The sheet fed as mentioned above is dealt with a roller 502 and a bat 503 for proper feeding, and it is carried through rollers 504, 505 onto the platen glass 18. A sensor SE51 detects a document at the roller 505. The sheet is stopped just after the end of the document passes the left end of a document scale 512. Thus, the right end of the document touches the edge of the document scale 512 to place the document correctly on the platen glass 18. At this time, the top end of a next document reaches the resist rollers 505 for shortening the time needed for feeding.

The scanner 19 starts the scan after a document is set on the platen glass 18 by the document feeder 500 in order to read the surface (bottom surface) of the document. After the reading completes, the document is carried to the left side by a carriage belt 506 and is reversed with U turn. Usually, the document passes above a claw 508 with discharge rollers 509 to a discharge tray 511 with face up. A sensor SE 54 detects a document on the discharge tray 511.

On the other hand, in the mode of both sides copy, the claw 508 is changed so that its left edge is moved upward. Then, the document passes after the U-turn below the claw 508 and is introduced below the carriage belt 506. The document is moved further to the left. Thus, the document is positioned on the platen 18 with faces reversed. Then, the rear side of the document is read. After both sides of the document are read, the carriage belt 506 is reversed to move the document to the left and after a reverse roller 507 reverses the document, it is carried again onto the platen glass 18. Then, the document is carried again to the left side, but passes above the claw 509 this time to be discharged to the tray 511 with face up.

The image data processor 20 processes the digital image data received from the scan system 10 and it comprises an A/D converter, a shading correction section, a color decision section, a magnification processing section and an image quality correction section (not shown). In the image signal processor 20, image signals received by the photoelectric conversion elements 16, 17 are quantized as 8-bit image data for each pixel, and the image data are subjected to various processings to be sent as image data D2. At the same time, a 1-bit color data DC is sent for each pixel to indicate that the color is the specified color or not. Then, the image data processor 20 sends image data with color data to the memory unit 30.

A memory unit 30 stores the image data received from the image data processor 20 and sends it to a printer or to a memory, and the details of the memory unit 30 are explained later.

The printer (PRT) comprises a print processor 40, an optical system 60, and an image forming system 70. The print processor 40 receives image data with color data from the memory unit 30 and allots the image data for each color. The print processor 40 provides drive signals of two laser diodes 61, 62 of the optical system 60 according to the image data while delaying the drive signals for the laser diode 62 according to the difference of the exposure positions of the two colors on the photoconductor drum 71.

The optical system 60 guides two laser beams of the laser diodes 61, 62 to different exposure positions on the photoconductor drum 71 according to image data received from the memory unit 30. That is, the two laser beams emitted from the laser diodes 61, 62 are synthesized by a first dichroic mirror 63. Then, the synthesized beam is reflected by a polygon mirror 65 for the exposure along the main scan direction, converged by a main lens 69, and reflected by a mirror 67a. The synthesized two beams are separated again by a second dichroic mirror 68, and the two beams are reflected by mirrors 67a and 67b to expose the photoconductor drum 71 at different exposure positions.

The image forming system 70 develops a latent image formed by the exposure on the photoconductor drum 71, and it transfers and fixes the image to a sheet of paper. The image forming system 70 comprises a development and transfer system 70A, a feed system 70B and a fixing system 70C.

The development and transfer system 70A comprises the photoconductor drum 71 which can be driven in a counterclockwise direction. A first sensitizing charger 72a, a first development unit 73a, a second sensitizing charger 72b, a second development unit 73b, a transfer charger 74, a separation charger 75 and a cleaning unit 76 are arranged successively around the photoconductor drum 71. The first development unit 73a contains two-component development materials consisting of red toners and carriers, while the second development unit 73b contains those consisting of black toners and carriers. The photoconductor drum 71 is charged uniformly by the first sensitizing charger 72a, and an electrostatic latent image is next formed by the beam reflected by the mirror 67c for red image data. Then, the latent image is developed by the first development unit 73a to form a red toner image, which is next transferred to a sheet of paper. Similarly, the photoconductor drum 71 is charged uniformly by the second sensitizing charger 72b, and an electrostatic latent image is next formed by the beam reflected by the mirror 67b for black image data. Then, the latent image is developed by the second development unit 73b to form a black toner image, which is next transferred to the same sheet of paper.

The feed system 70B comprises cassettes 80a, 80b, sensors SE11, SE12 for detection the sizes, a paper guide 81, timing rollers 82, a carriage belt 83 and horizontal feed rollers 86a–86c. A sheet of paper is fed from one of the cassettes 80a, 80b to the timing roller 82, and it is fed to the transfer section at appropriate timing for the transfer of toner image. The horizontal feed rollers 86a–86c feed a sheet of paper provided from a re-feed unit 600.

In the fixing system 70C, fixing rollers 84 fix the image on the sheet of paper thermally and discharge rollers 85 discharge the sheet to a discharge tray 621 in the re-feed unit 600. A discharge sensor SE62 detects the discharge of a sheet of paper.

The re-feed unit 600 feeds a sheet of paper again toward the transfer position in the mode of copying on both sides of a sheet of paper or in the mode of synthesis copy. In the mode of both side copy for copying both sides of a sheet of paper, the left end of a claw 601 is moved upward with a solenoid (not shown) and a sheet of paper discharged from the discharge rollers 85 is moved through the carriage rollers 602 to the reverse rollers 603. When the last end of the sheet reaches a reverse sensor SE61, the reverse rollers 603 move the sheet inversely to feed it to the horizontal feed rollers 86a. Then, the sheet is carried through the rollers 86b, 86c to the timing rollers 82. In the mode of synthesis copy, the sheet of paper discharged from the discharge rollers 85a is not reversed and is carried to the horizontal feed rollers 86a.

Figure 2:
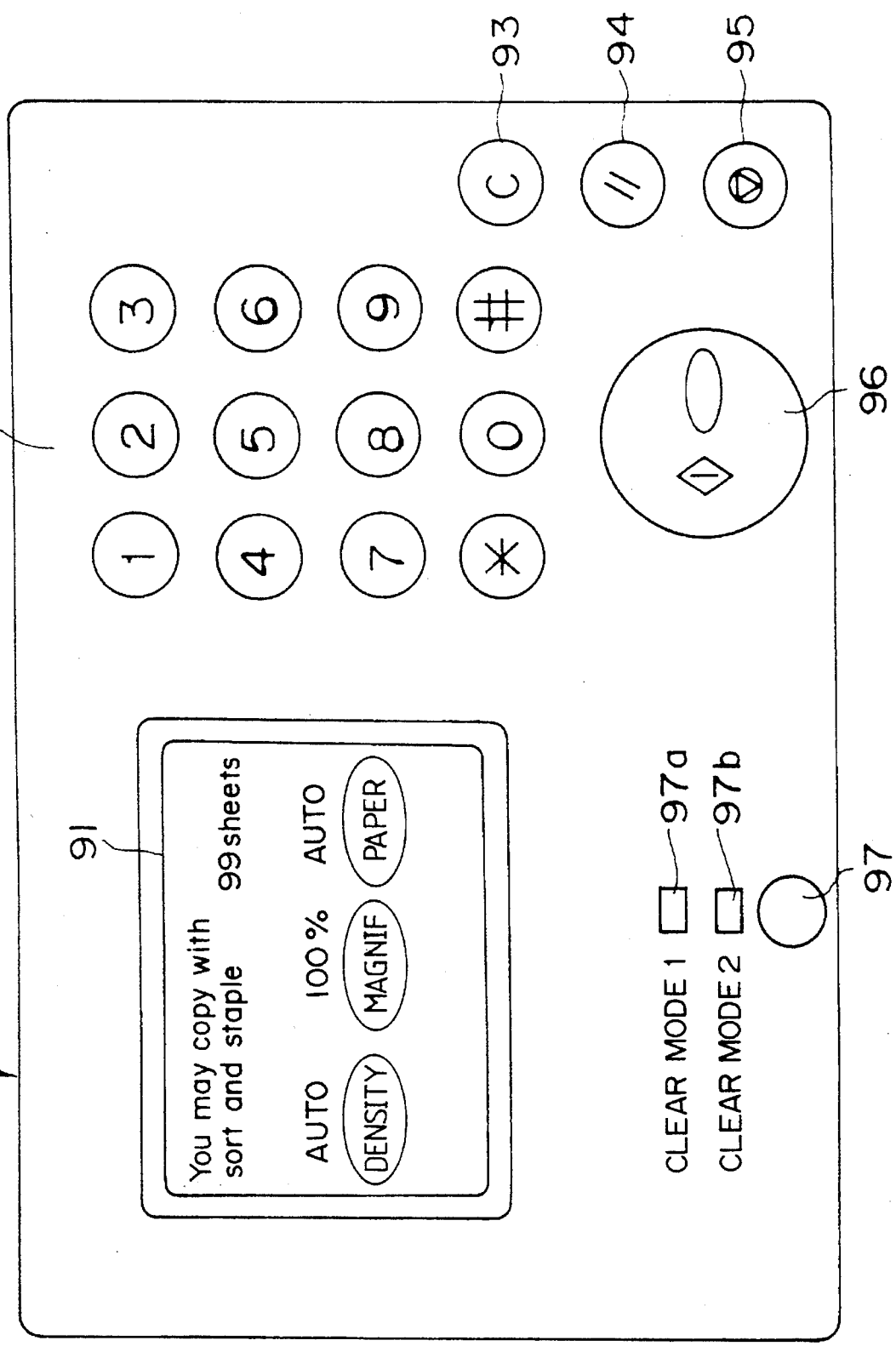
FIG. 2 is a front view of an operational panel.

FIG. 2 shows an operational panel 90 provided above the top of the main body of the copying apparatus. In the operational panel 90, a liquid crystal touch panel 91 displays various kinds of messages and statuses such as jam, operational modes such as density level, magnification power, paper size and the like. The operational mode can also be selected by the touch panel 91. Ten-keys 92 are used to input the number of copies and the magnification power. A clear key 93 is used to reset the number of copies to the standard number of one. A panel reset key 94 is used to reset the values for the copying apparatus to the standard values. A stop key 95 is used to stop the copying action. A start key 96 is used to start the copying action. A mode set key 97 is used to set one of the two clear modes according the present invention which are explained later in detail. Mode displays 97a and 97b display first and second clear modes, respectively.

Figure 3:
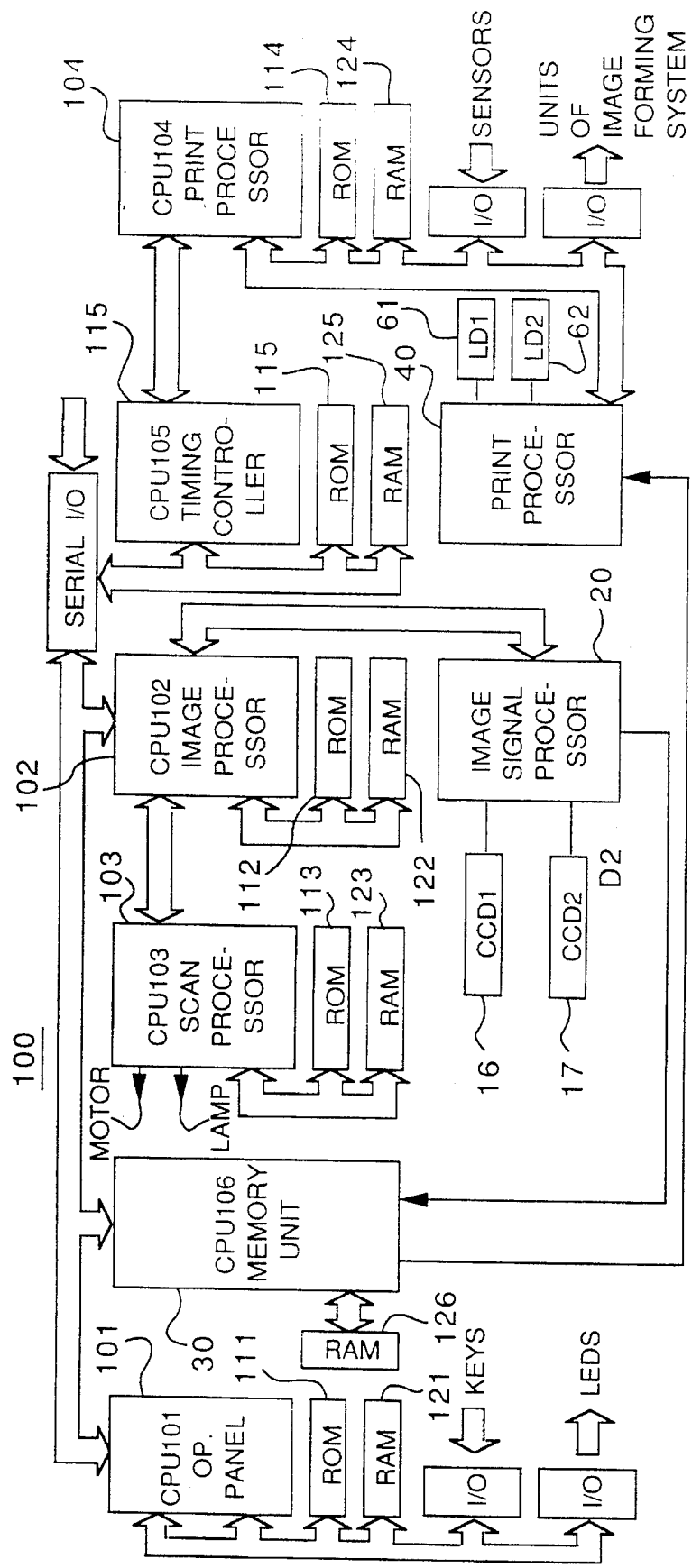
FIG. 3 is a block diagram of a part of a controller.
Figure 4:
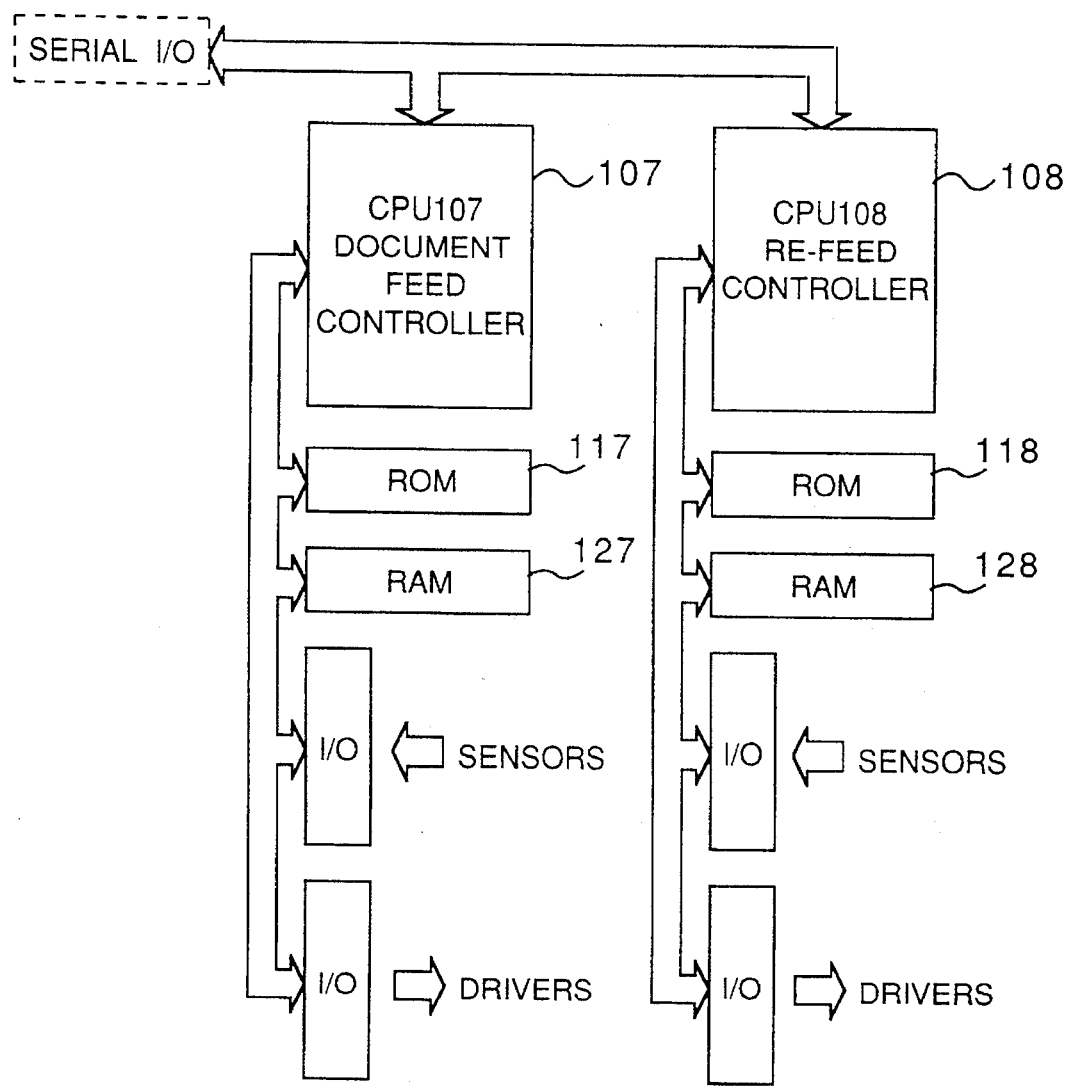
FIG. 4 is a block diagram of the other part of the controller.

FIGS. 3 and 4 show block diagrams of a control section 100 of the copying apparatus comprising eight CPUs 101–108. Each CPU 101–108 is connected to a ROM 111–118 for storing a program and to a RAM 121–128 as a work area for the program, and if necessary to I/O ports.

The CPU 101 controls the key-inputs with various operational keys and the display of signals of the operational panel 90. The CPU 102 controls the various units of the image signal processor 20. The CPU 103 controls the drive of the scan system 10. The CPU 104 controls the print processor 40, the optical system 60 and the image forming system 70. The CPU 105 processes the timing control and the mode setting of the entire controller 100. The CPU 106 controls the memory unit 30 to store image data in an image memory 304 and to read it to send to the print processor 40. The CPU 107 controls the document feeder 500. The CPU 108 controls the re-feed unit 600. The CPUs 101–108 communicate with each other to send or receive commands, reports and the like with use of interrupts.

Figure 5:
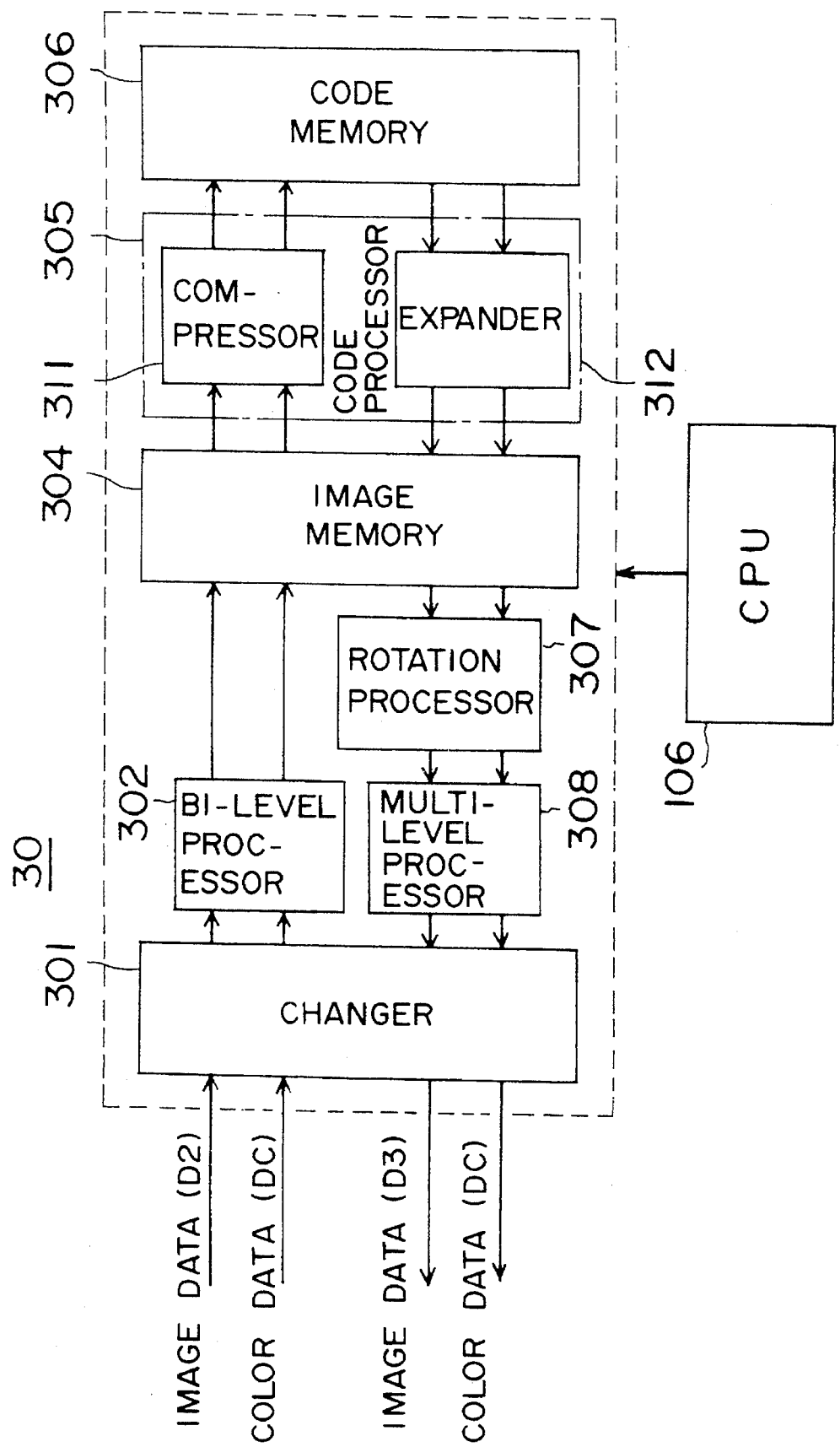
FIG. 5 is a block diagram of a memory unit.

FIG. 5 shows a block diagram of the memory unit 30. A bi-level processor 302 generates bi-level data according to the parameters set by the CPU 106 from input image data D2 through a changer 301. A multi-port image memory 304 can store image data of two pages of A4 size at 400 dots per inch. A code processor 305 comprises a compressor 311 and an expander 312 which can be operated independent of each other. When image data D2 are stored in the image memory 304, the code processor 305 reads the image data and compresses them by the compressor 311 to generate code data so as to be stored in a multi-port code memory 306. Further, the code processor 305 reads the code data written in the code memory 306 and expands them by the expander 312 so as to be written in the image memory 304. The compressor 311 and the expander 312 access the code memory 306 with direct memory access, and the code memory 306 is managed with a management table MT1 stored in a RAM 126 (refer FIG. 6(a)). When a page of image data is stored in the image memory 304 by the expander 312, they are processed for rotation of image by a rotation processor 307 if necessary. Then, multi-level image data are generated by a multi-level processor 308 to be sent through the changer 301 as image data D3. As will be explained later, the data of the image memory 304 is cleared when a memory clear command is received (refer FIG. 20).

Figure 6A:
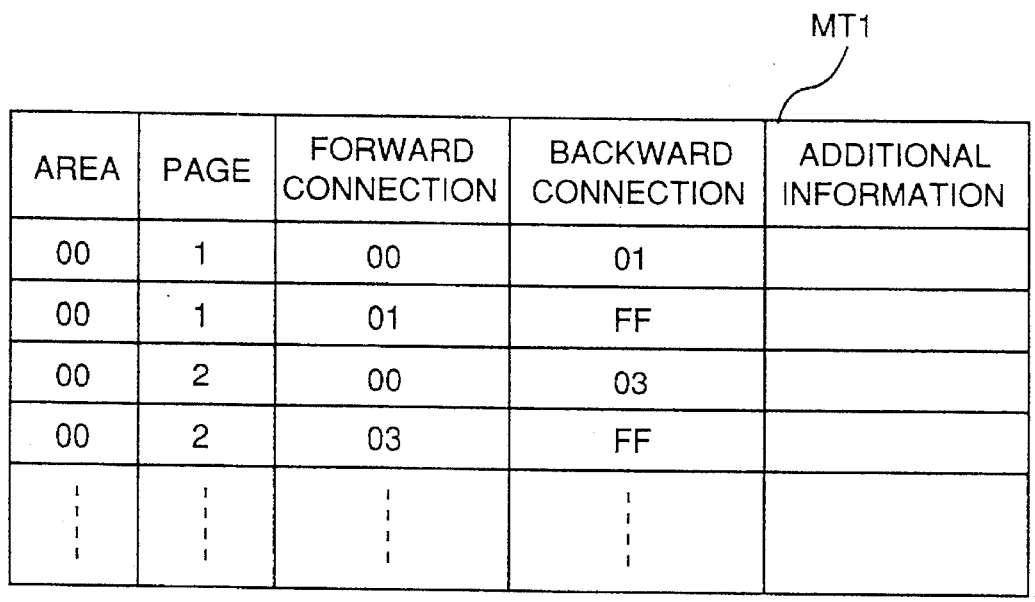
FIG. 6(a) is a diagram of a management table.
Figure 6B:
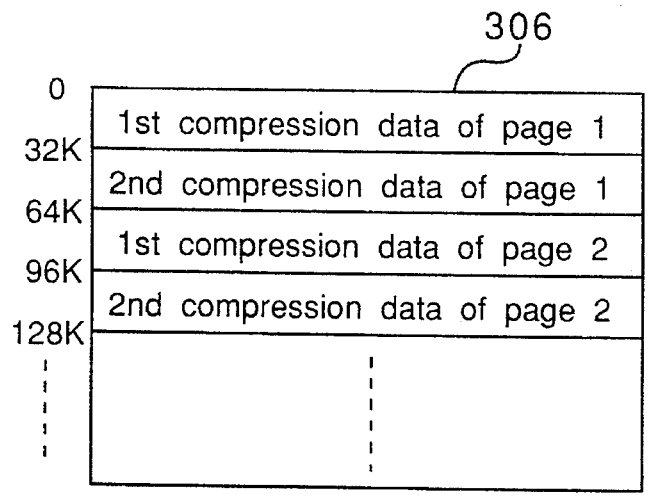
FIG. 6(b) is a diagram of the memory map of a code memory.

FIG. 6(a) shows the management table MT1, while FIG. 6(b) shows the code memory 306. The code memory 306 is divided into memory areas each of 32 kbytes as shown in FIG. 6(b). The management table MT1 stores a number representing the memory area, a page number, numbers of forward and backward connection areas, and various additional information such as compression method and data length necessary for the compression and expansion. The code memory 306 is managed dynamically according to these management data.

The CPU 106 generates the information for the management table MT1 while compressing the image data read from the image memory 304 and controls the compressor 311 to generate code data to be stored in the code memory 306. When the image data is requested to be sent, the code data are read from the code memory 306 according to a procedure reverse to the above-mentioned one. The information in the management table MT1 is cleared by the CPU 106 when a memory clear command is received from the CPU 105 at a timing selected according to a clear mode.

There are memory mode and mixture mode in the memory unit 30, but the mixture mode is not explained here. The memory mode includes memory mode write operation and memory mode read operation. In the memory mode, after the image data D2 are binarized, they are stored in the image memory 304 and necessary processings are performed. Then, if necessary, the data are read from the image memory 304, and are sent to the print processor 40 as the image data D3.

In the digital copying apparatus, the digital image data of a document to be copied are stored in the memory unit 30, and an image is copied on a paper according to the digital image data stored in the memory unit 30. As to the memory clear, it is to be noted that when an ordinary user completes the copying operation for a desired number of copies, the document on a platen is removed and a next document is placed on the platen. Then, in this copying apparatus, two clear modes are provided for clearing the image data stored in the memory unit 30. In the first clear mode, the data in the memory unit 30 is cleared when the document is detected to be removed from the platen glass 18. In the second clear mode, the data in the memory unit 30 is cleared when a new document is detected to be set on the platen glass 18 after the previous document is removed from the platen glass 18. If a document feeder 500 is used to feed documents, memory clear is also performed similarly when the document is removed from the discharge tray 511 and when a document is placed on the document feed tray 510. The existence of a document on the platen glass 18 is detected with the sensor SE20 (refer FIG. 11), while the existence of a document in the paper feed tray and in the discharge tray in the document feeder 50 is detected with the sensors SE53 and SE54 (refer FIG. 23). One of the two clear modes is selected with a mode set key 97 in the operational panel 90 and the selected mode is displayed with mode displays 97a and 97b (refer FIG. 8). A memory clear command is sent to the memory unit 30 at an appropriate timing in the two clear modes (refer FIG. 17), and the memory clear is executed by the memory unit 30 (refer FIG. 21). The memory clear command is sent only after the copying operation is completed or it is inhibited to clear the image data when a latent image is being formed according to the image data.

Next, the control of the digital copying apparatus is explained in detail with reference to appended flowcharts.

Figure 7:
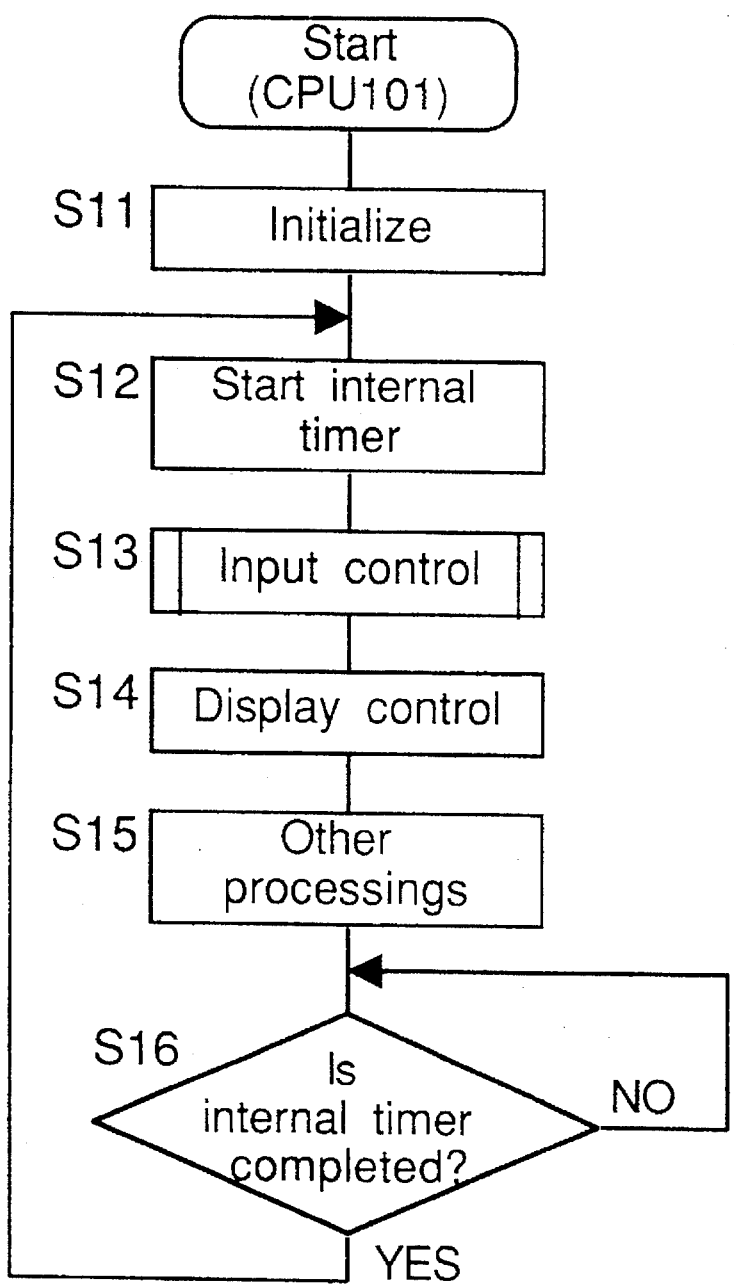
FIG. 7 is a main flowchart of CPU 101.

FIG. 7 shows a flowchart of a main routine executed by the CPU 101 which controls the key-inputs and displays of the operational panel 90. After the initialization of various values (step S11), an internal timer is started (step S12). Next, key-inputs and the displays are controlled for the operational panel 91 and the like (steps S13 and S14). Then, other processings are performed (step S15). Finally, it is waited that the internal timer is completed (step S16) in order to make the processing time of the routine constant. Further, the communication with other CPUs 102–108 is performed with interrupt processing.

Figure 8:
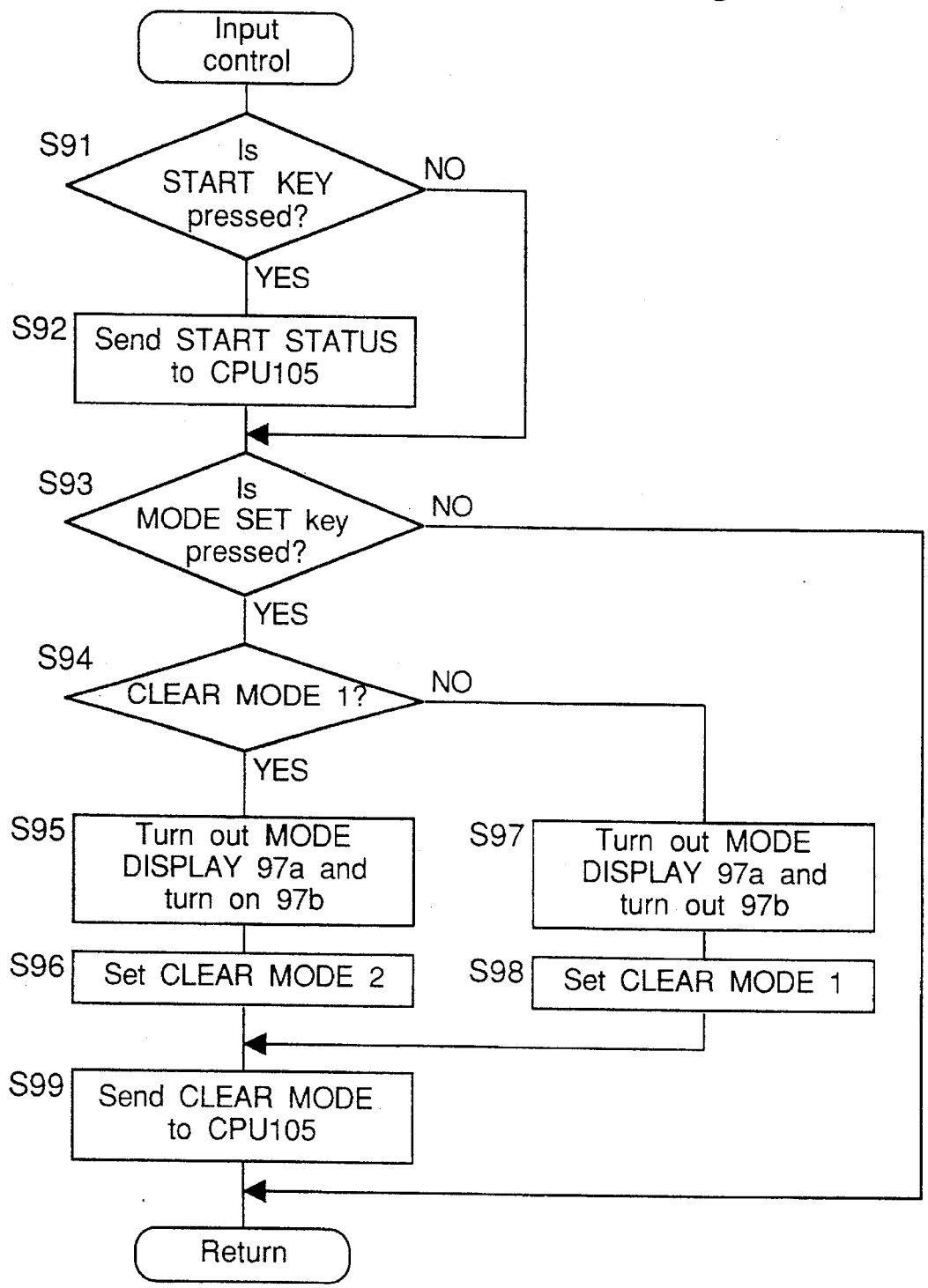
FIG. 8 is a flowchart of input processing (step S13 in FIG. 7)

FIG. 8 is a flowchart of the input control (step S13 in FIG. 7). If it is detected that the start key 96 is pressed (YES at step S91), a start status indicating that the start key 96 is pressed is sent to the CPU 105 (step S92) which controls the entire copying apparatus.

Next, if the mode set key 97 is detected to be pressed (YES at step S93), one of the two clear modes is set. First, it is decided if the first clear mode has been set or not (step S94). That is, it is checked if the mode display 97a is turned on or not. If the first clear mode is decided to be set (YES at step S94), the mode display 97a is turned out and the mode display 97b is turned on (step S95). Then, the second clear mode is set (step S96). On the other hand, if the first clear mode is decided not to be set (NO at step S94), the mode display 97a is turned on and the mode display 97b is turned out (step S97). Then, the first clear mode is set (step S98). Finally, the clear mode is sent to the CPU 105 (step S99), and the flow returns to the main flow.

Figure 9:
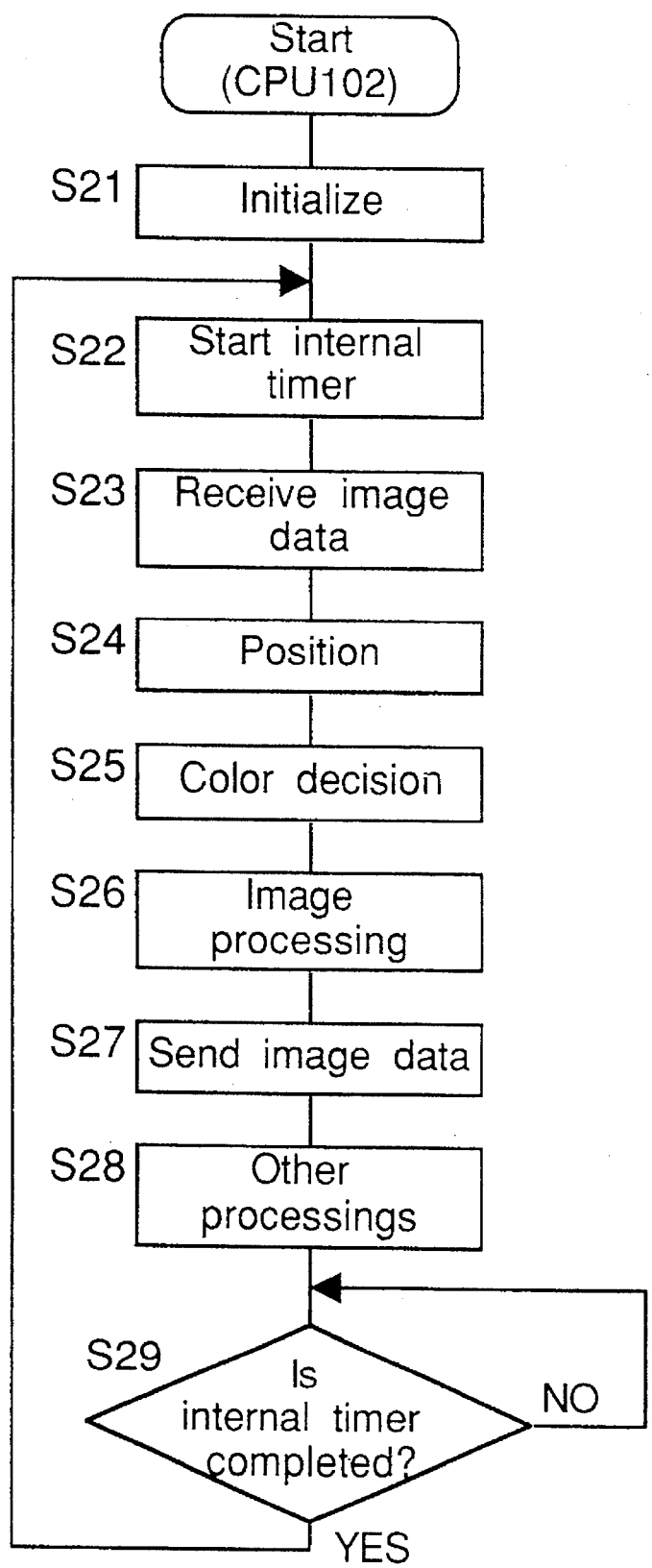
FIG. 9 is a main flowchart of CPU 102.

FIG. 9 is a flowchart of the main routine of the CPU 102 which controls the image signal processor 20. After the initialization of various values (step S21), an internal timer is started (step S22). Next, image data is received (step S23). Then, the position is controlled in order to adjust the time difference due to the difference of the exposure positions for the two beams (step S24), and the color is decided according to the color data (step S25). Next, the image data are processed (step S26) and the processed data are sent to the memory unit 30 (step S27). Then, other processings are performed (step S28). Finally, it is waited that the internal timer is completed (step S29) in order to make the processing time of the routine constant.

Figure 10:
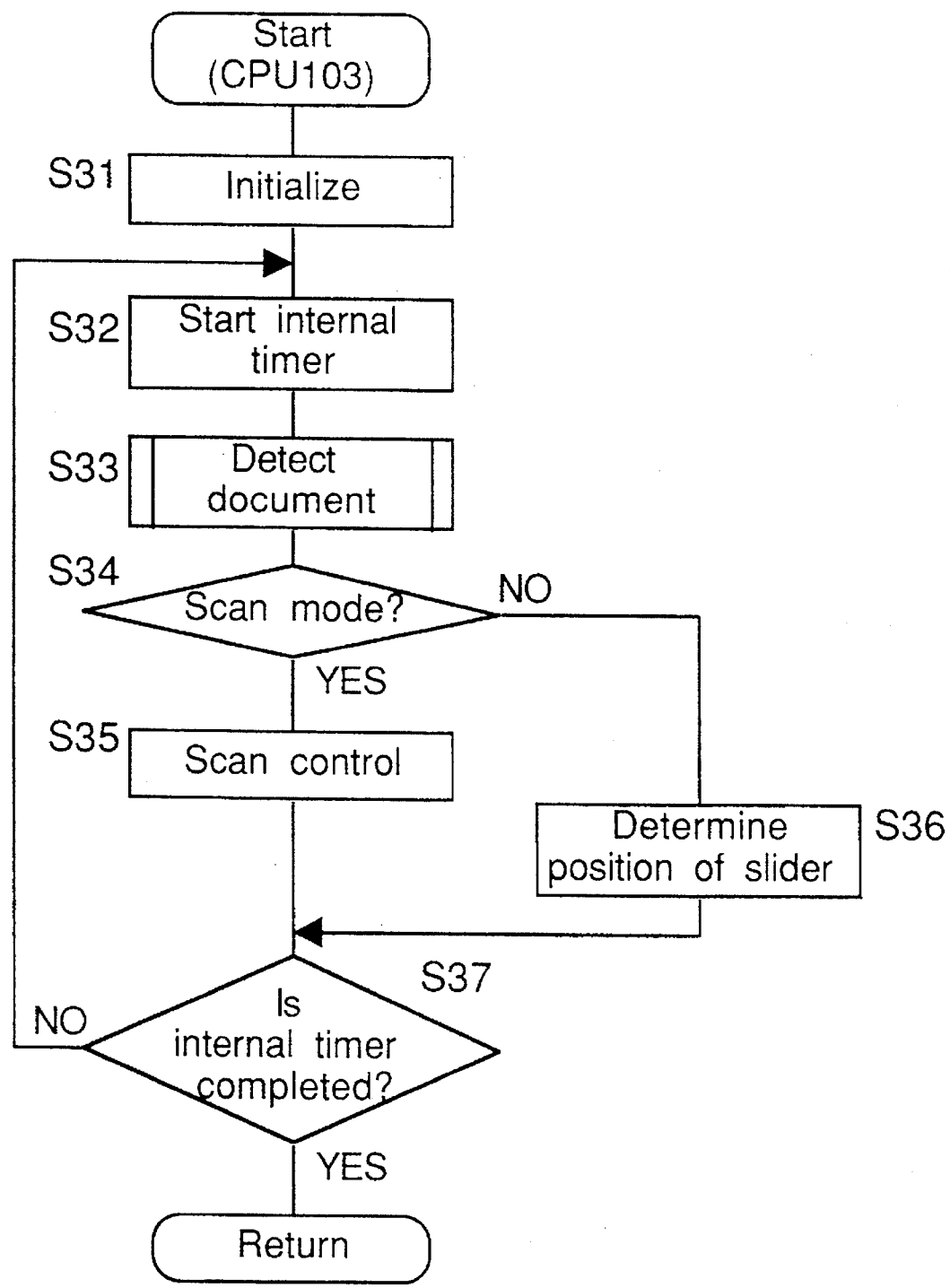
FIG. 10 is a main flowchart of CPU 103.

FIG. 10 is a flowchart of the main routine of the CPU 103 which controls the scan system 10. After the initialization of various values (step S31), an internal timer is started (step S32). Next, a document is detected with the sensor SE20 (step S33, refer FIG. 11). Then, if it is decided that the scan mode is set (YES at step S34), the scan control is performed for the scanner 19 (step S35). If the scan mode is decided not to be set (NO at step S34), the position of the slider 19 is determined (step S36), but this processing is not explained further. Finally, it is decided if the internal timer is completed or not (step S37) in order to make the processing time of the routine constant. If the internal timer is decided not to be completed (NO st step S37), the flow returns to Step S32.

Figure 11:
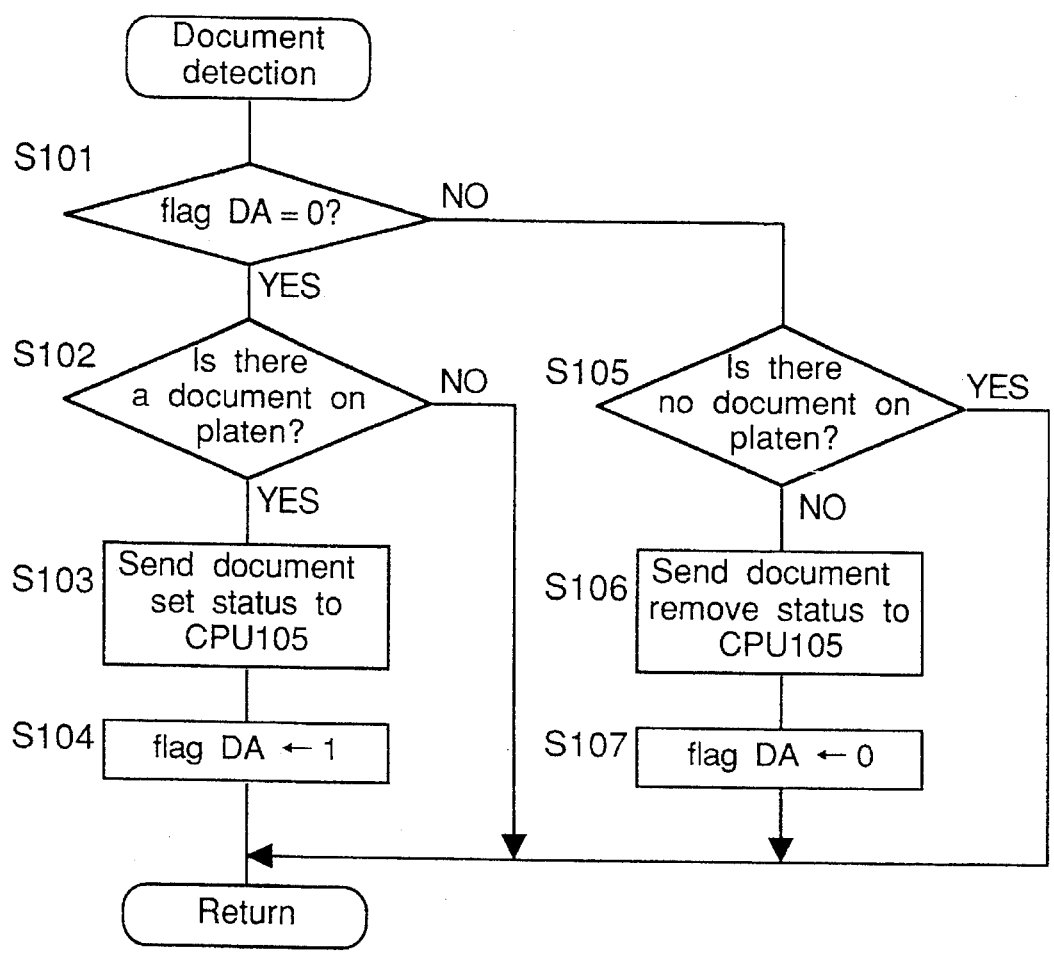
FIG. 11 is a flowchart of document detection (step S33 in FIG. 10)

FIG. 11 is a flowchart of the document detection (step S33 in FIG. 10). First, it is decided if a flag DA on the existence of a document on the platen glass 18 is "0" or not (step S101). The flag DA of "0" means that there was no document on the platen glass 18. If it is decided that there was no document on the platen glass 18 (YES at step S101), it is decided next with the sensor SE20 if a new document exist or not on the platen glass 18 (step S102). If a document is decided to exist on the platen glass 18 (YES at step S102), a document set status is sent to the CPU 105 for the control of the control section 100 (step S103) so as to set a document set flag (DB) (refer step S118 in FIG. 15), and the flag DA is set to be "1" (step S104). If a document is decided still not to exist (NO at step S102), the flow returns readily.

If it is decided that there was a document on the platen glass 18 (NO at step S101), it is decided next with the sensor SE20 if the document exist or not (step S105). If the document is decided not to exist on the platen glass 18 (NO at step S105), a document remove status is sent to the CPU 105 (step S106) so as to set a document remove flag (DC) (refer step S120 in FIG. 15), and the flag DA is set to be "0" (step S107). If the document is decided still to exist (YES at step S102), the flow returns readily.

Figure 12:
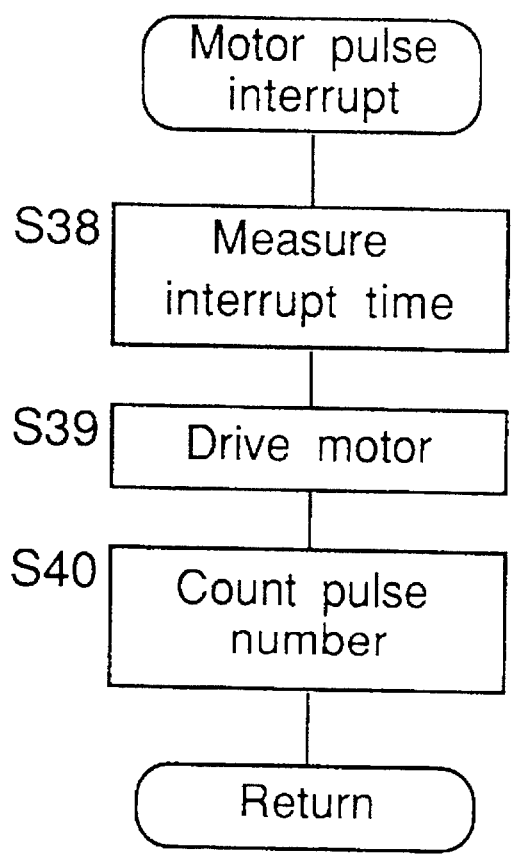
FIG. 12 is a flowchart of motor pulse interrupt.

FIG. 12 is a flowchart of motor pulse interrupt. This flow is executed when a motor pulse interrupt happens due to a motor pulse generated synchronously with the rotation of the scan motor M2. First, an interrupt time interval of the motor pulses is measured (step S38). Then, the scan motor M2 is driven (step S39), and the number of motor pulses is counted (step S40).

Figure 13:
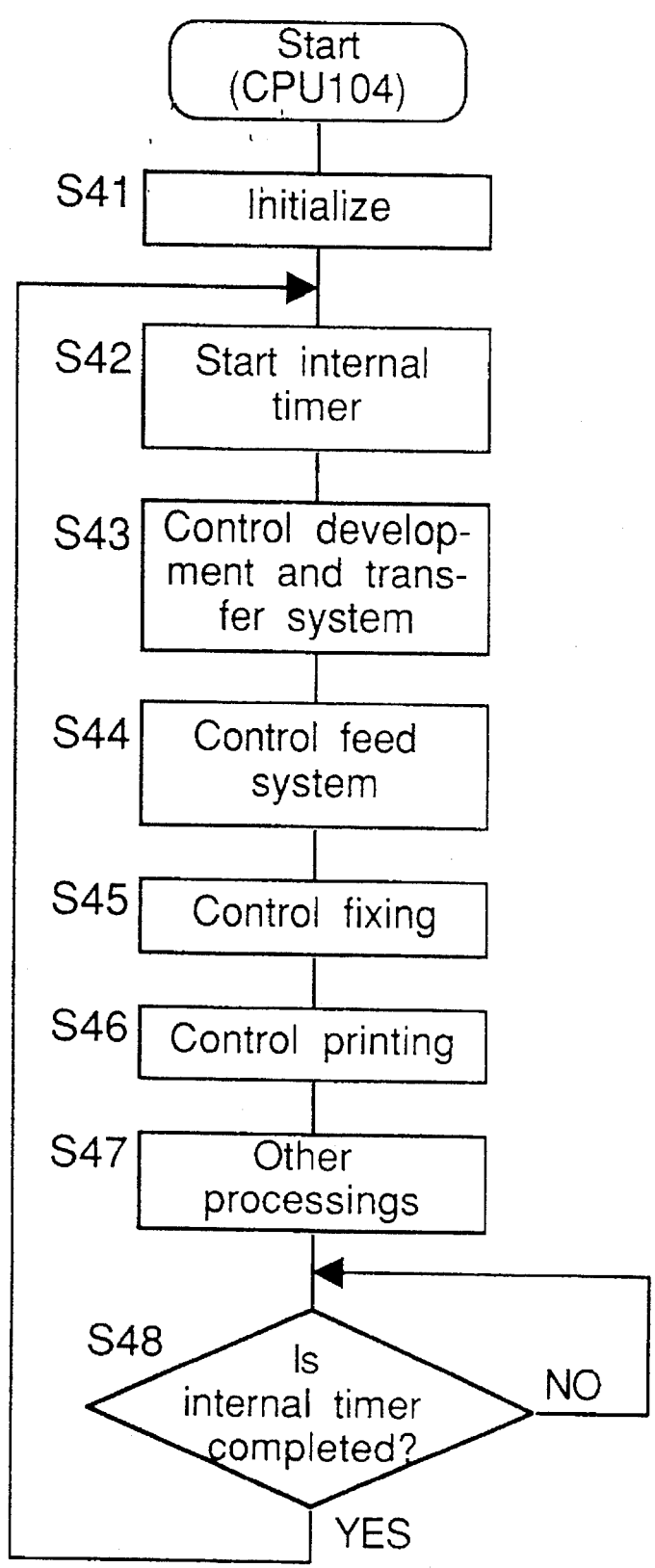
FIG. 13 is a main flowchart of CPU 104.

FIG. 13 is a flowchart of the main routine of the CPU 104 which controls the print processor 40, the optical system 60 and the image forming system 70. After the initialization of various values (step S41), an internal timer is started (step S42). Next, the development and transfer system 70A is controlled (step S43), the feed system 70B is controlled (step S44), the fixing system 70C is controlled (step S45) and the print processor 40 is controlled (step S46) successively. Then, other processings are performed (step S47). Finally, it is waited that the internal timer is completed (step S48) in order to make the processing time of the routine constant.

Figure 14:
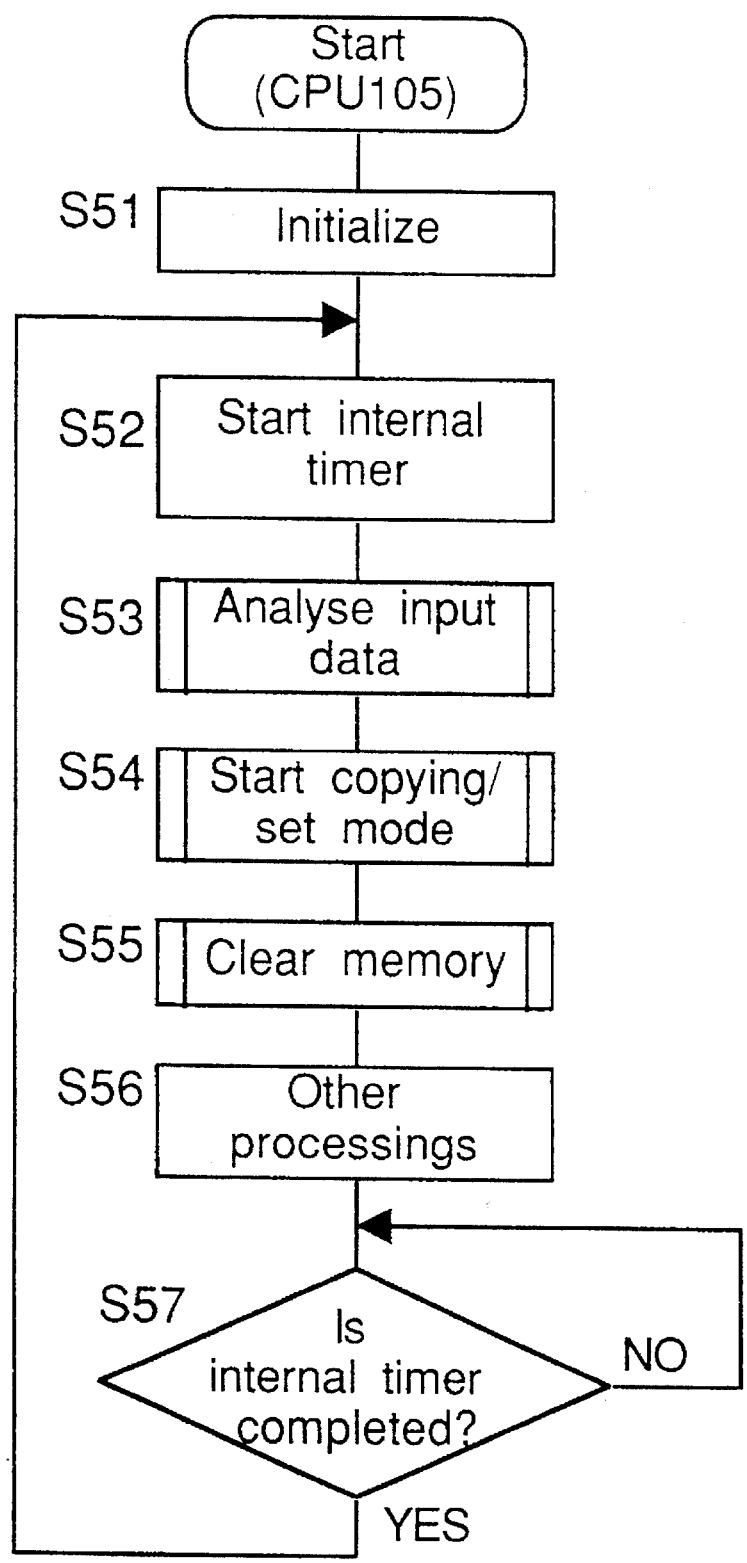
FIG. 14 is a main flowchart of CPU 105.

FIG. 14 is a flowchart of the main routine of the CPU 105 which controls the timings and mode setting of the control system 100. After the initialization of various values (step S51), an internal timer is started (step S52). Next, the input data received on interrupts are checked and the content of the data is analyzed (step S53, refer FIG. 15). Then, the copy start, the mode of copying and the like are set (step S54). That is, the mode of copying, the magnification and the like are set. Next, a clear mode is sent at a timing of memory clear (step S55, refer FIG. 17). Then, other processings are performed (step S56). Finally, it is waited that the internal timer is completed (step S57) in order to make the processing time of the routine constant.

Figure 15:
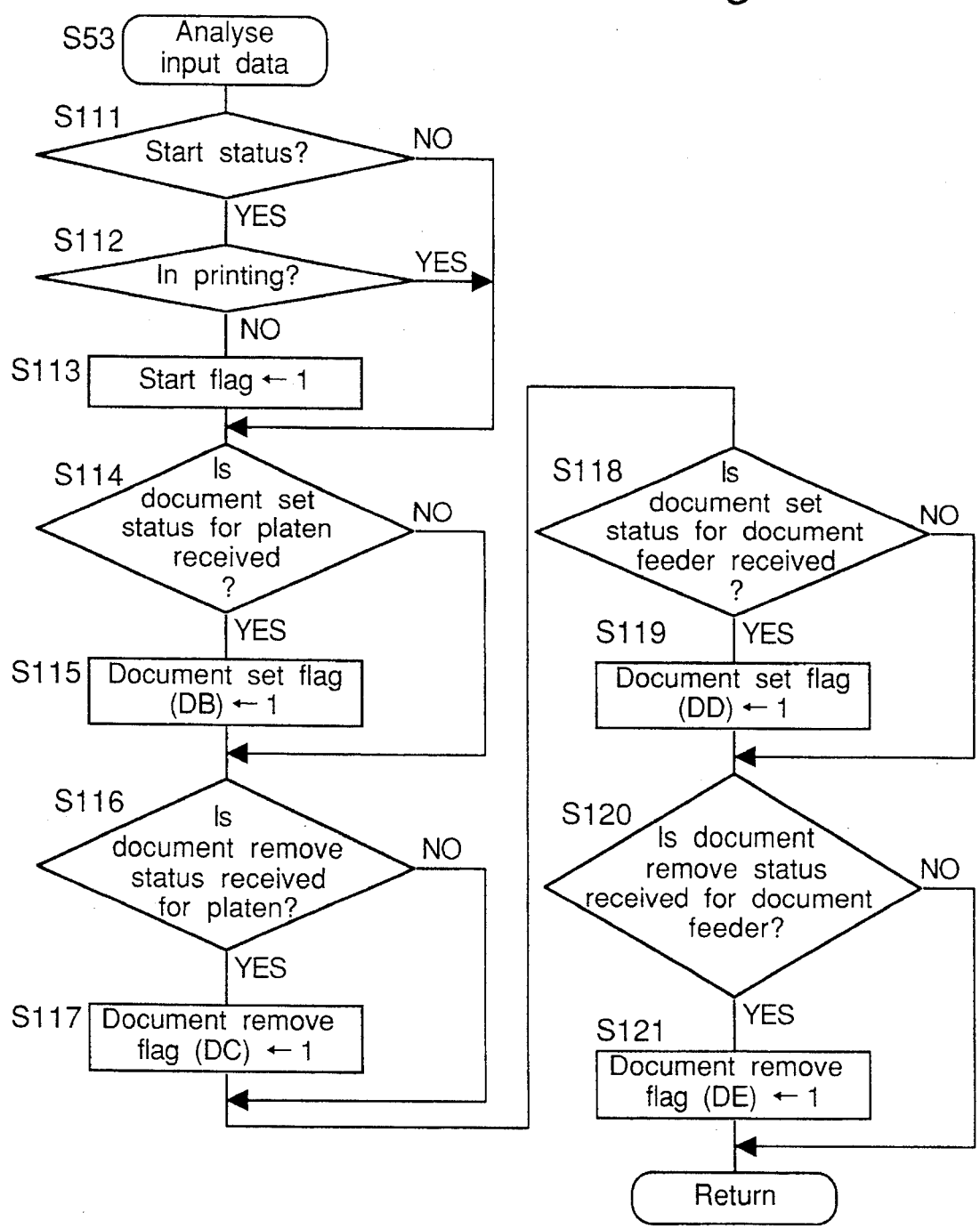
FIG. 15 is a flowchart of input data analysis (step S53 in FIG. 14)

FIG. 15 is a flowchart of the input data analysis (step S53 in FIG. 14). If a start status is decided to be received (YES at step S111) and if the printing is decided not to be under progress (NO at step S112), a start flag is set to be "1" (step S113). Otherwise, the value of the start flag is kept the same.

Next, it is decided if a document set status is received from the scan system 10 (YES at step S114, refer step S103 in FIG. 11), a document set flag for the platen glass 18 is set to be "1" (step S115). On the other hand, it is decided if a document remove status is received from the scan system 10 (YES at step S116, refer step S106 in FIG. 11), a document remove flag for the platen glass 18 is set to be "1" (step S117).

Further, it is decided if a document set status is received from the document feeder 500 (YES at step S118, refer step S503 in FIG. 23), a document set flag (DD) for the document feeder 500 is set to be "1" (step S119). On the other hand, it is decided if a document remove status is received from the document feeder 500 (YES at step S120, refer step S511 in FIG. 23), a document remove flag (DE) for the document feeder 500 is set to be "1" (step S121).

Figure 16:
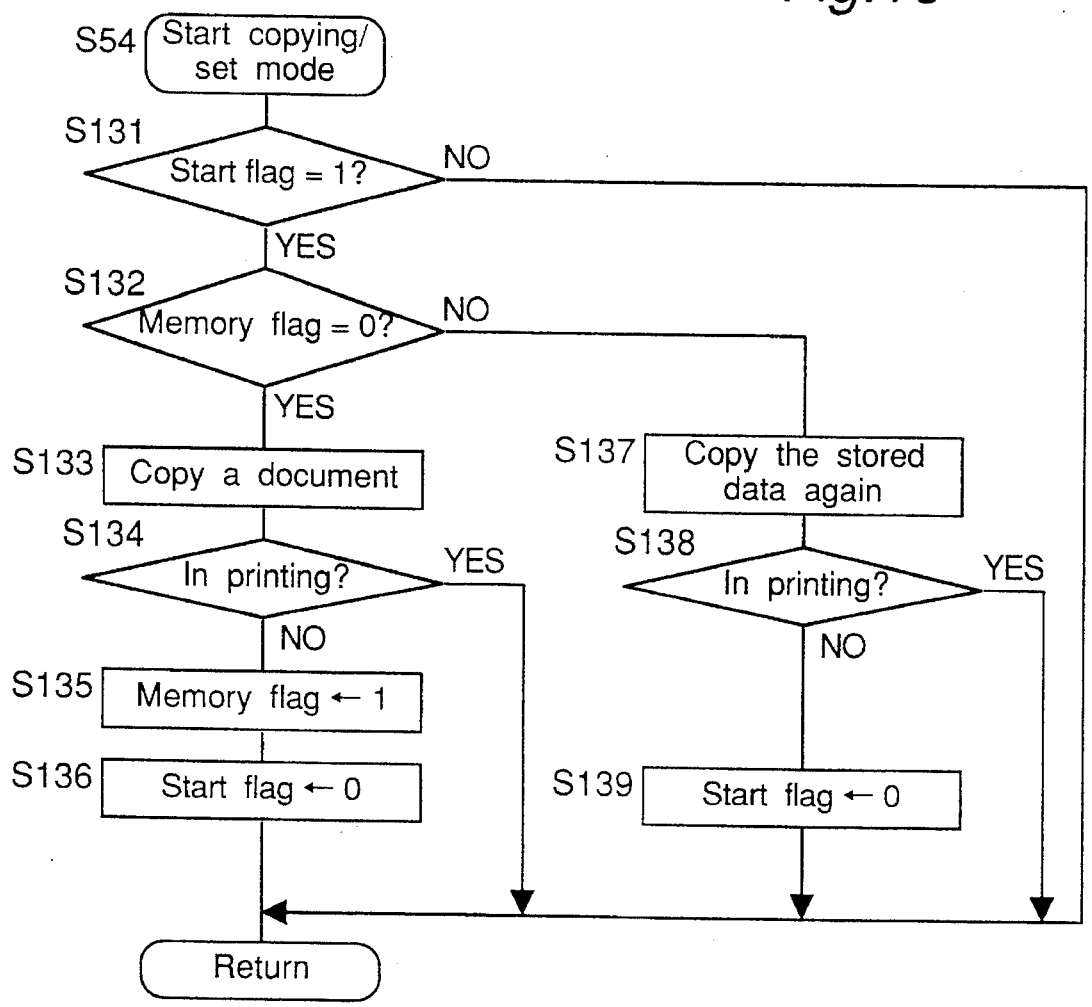
FIG. 16 is a flowchart of copy start/mode setting (step S54 in FIG. 14)

FIG. 16 is a flowchart of the copy start/mode setting (step S54 in FIG. 14). If it is decided that the start flag is "1" (YES at step S131), the following steps are executed. First, it is decided if the memory flag is "0" or not (step S132) or if there are any data stored in the memory unit 30. If there is no data in the memory unit 30 (YES at step S132), an ordinary copying action such as reading a document, storing the image data and printing the image data is performed (step S133). Then, if the printing is not under progress (NO at step S134) or the printing of all the pages completes, the memory set flag is set to be "1" (step S135), and the start flag is set to be "0" (step S136).

On the other hand, if the memory flag is decided not to be "0" (NO at step S132), there are data stored in the memory unit 30. Then, a copying operation is performed according to the stored data (step S137). Then, if the printing is not under progress (NO at step S134), the start flag is set to be "0" (step S136).

Figure 17:
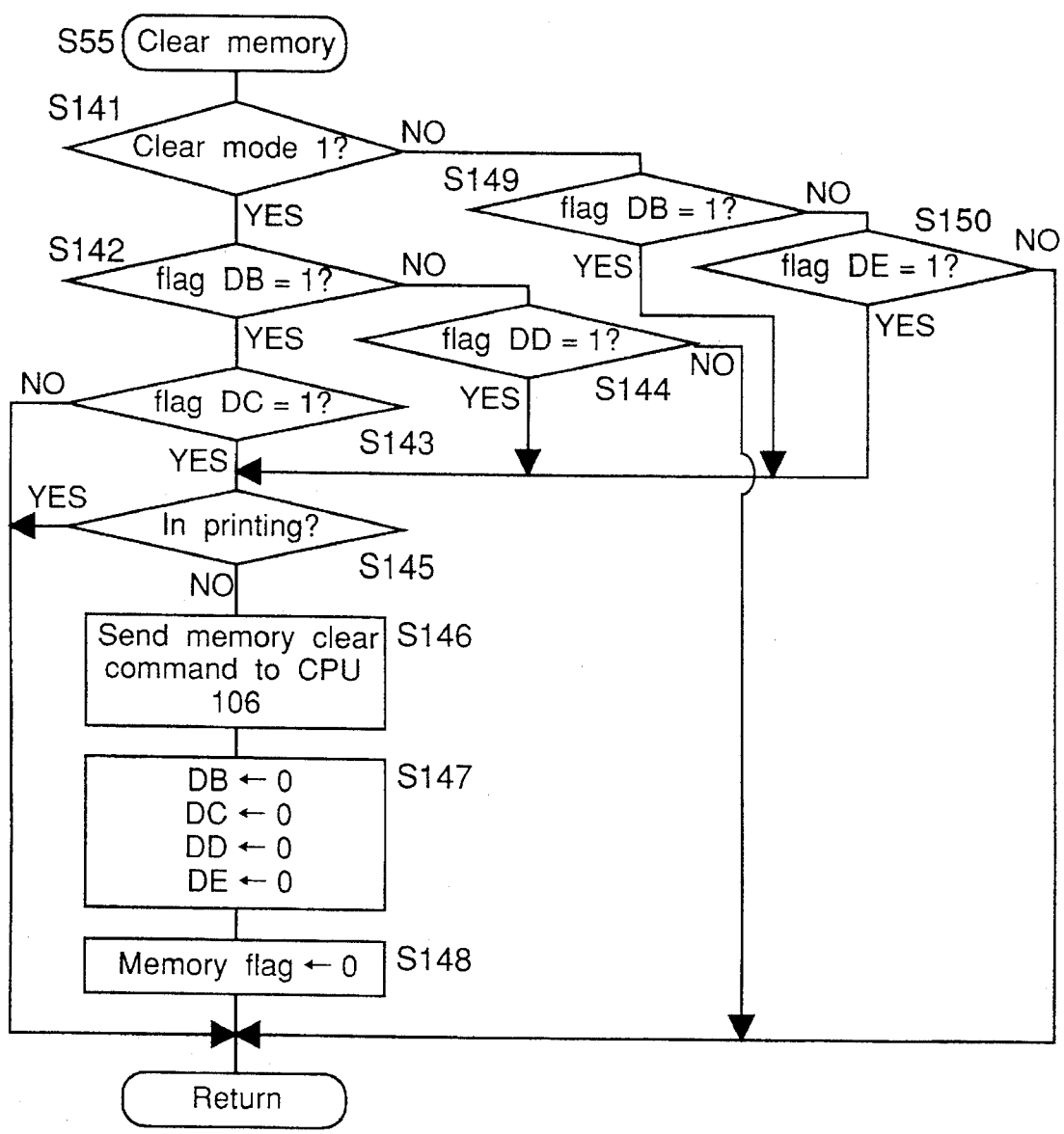
FIG. 17 is a flowchart of memory clear (step S55 in FIG. 14)

FIG. 17 is a flowchart of the memory clear (step S55 in FIG. 14). First, it is decided if the first clear mode is set or not (step S141). In the first clear mode, the data in the memory unit 30 is removed when the document on the platen is removed. In this mode, if a document set flag (DD) for the document feeder 500 is decided to be "1" (YES at step S142) or a document is set in the document feeder 500 and if a document remove flag (DE) is decided to be "1" or a document is removed from the document feeder 500 (YES at step S143), the flow proceeds to step S145. That is, after all the pages are printed (NO at step S145), a memory clear command is sent to the CPU 106 for clearing the digital image data (step S146), a document set flag (DB) for the platen glass 18, a document remove flag (DC) for the platen glass 18, a document set flag (DD) for the document feeder 500 and a document remove flag (DE) for the document feeder 500 are all reset to be "0" (step S147), and the memory flag is reset to be "0" (step S148). In a case that a document is not set in the document feeder 500 (NO at step S142) or the document is placed directly on the platen 18 and that the document is removed from the platen 18 or the flag DB is decided to be "1" (YES at step S144), the flow also proceeds to step S145. If the document is decided not to be removed (NO at steps S143 and S144), the flow returns readily to the main flow.

In the second clear mode (NO at step S141) wherein the data in the memory unit 30 is cleared when a new document is set, if a document set flag (DD) for the document feeder 500 is decided to be "1" (YES at step S149) or if a document set flag (DB) for the platen glass 18 is decided to be "1" (YES at step S150), the flow also proceeds to step S145. Otherwise, the flow returns readily to the main flow.

Figure 18:
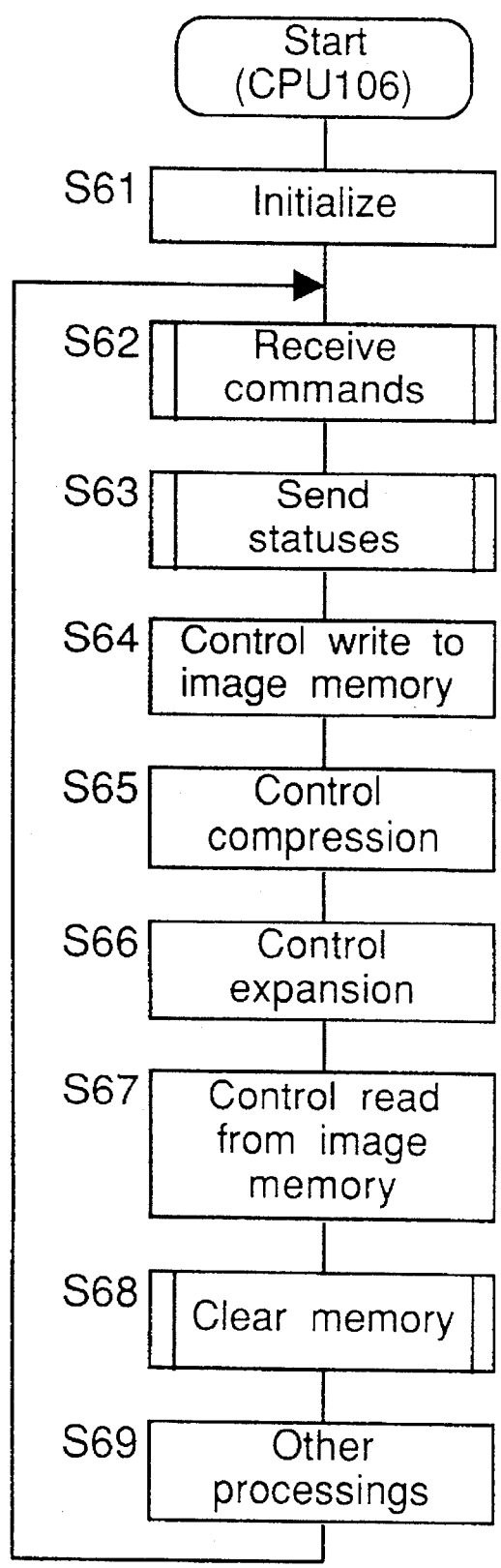
FIG. 18 is a main flowchart of CPU 106.

FIG. 18 is a flowchart of the main routine of the CPU 106 which controls the memory unit 30. After the initialization of various values (step S61), a command is received from other CPUs (step S62) and statuses are sent (step S63). Then, write to the image memory 304 is controlled (step S64), the compression is controlled (step S65), and the expansion is controlled (step S66), read from the image memory 304 is controlled (step S67) and the data in the image memory 304 is controlled (step S68). Then, other processings are performed (step S69), and the flow returns to step S62.

Figure 19:
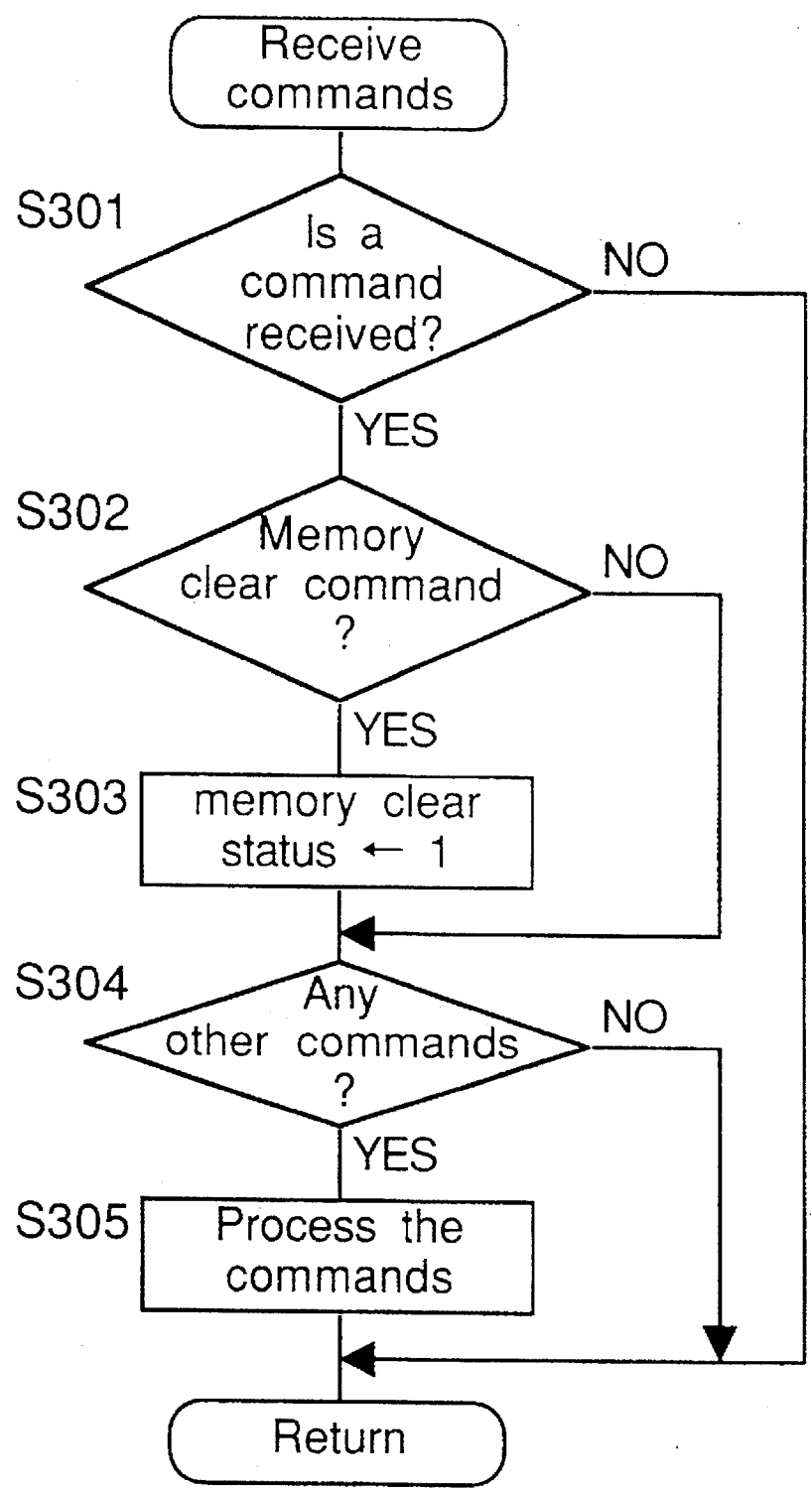
FIG. 19 is a flowchart of command receive (step S62 in FIG. 18)

FIG. 19 is a flowchart of the command receive (step S62 in FIG. 18). If a command is decided to be received from another CPU (YES at step S301), it is decided next if the command is a memory clear command (step S302), and the memory clear state is set to be "1" (step S303) if the memory clear command is received (YES at step S302). If the command is decided to be another command different from the memory clear command (YES at step S304), and a processing for the command such as write, compression or expansion is performed (step S305)

Figure 20:
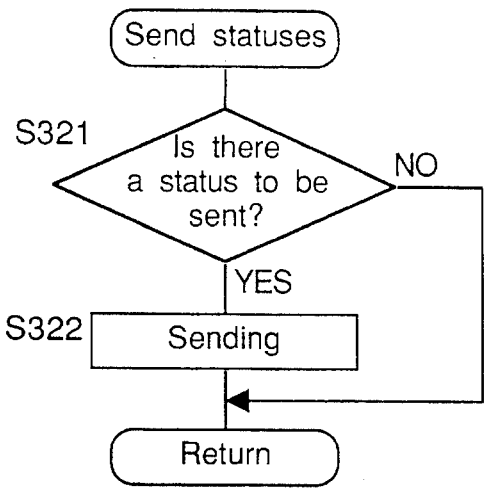
FIG. 20 is a flowchart of status transmission (step S63 in FIG. 18)

FIG. 20 is a flowchart of the status transmission (step S63 in FIG. 18). If it is decided there is a status which has to be sent to another CPU (YES at step S321), the status is transmitted to the CPU (step S322), and the flow returns to the main flow.

Figure 21:
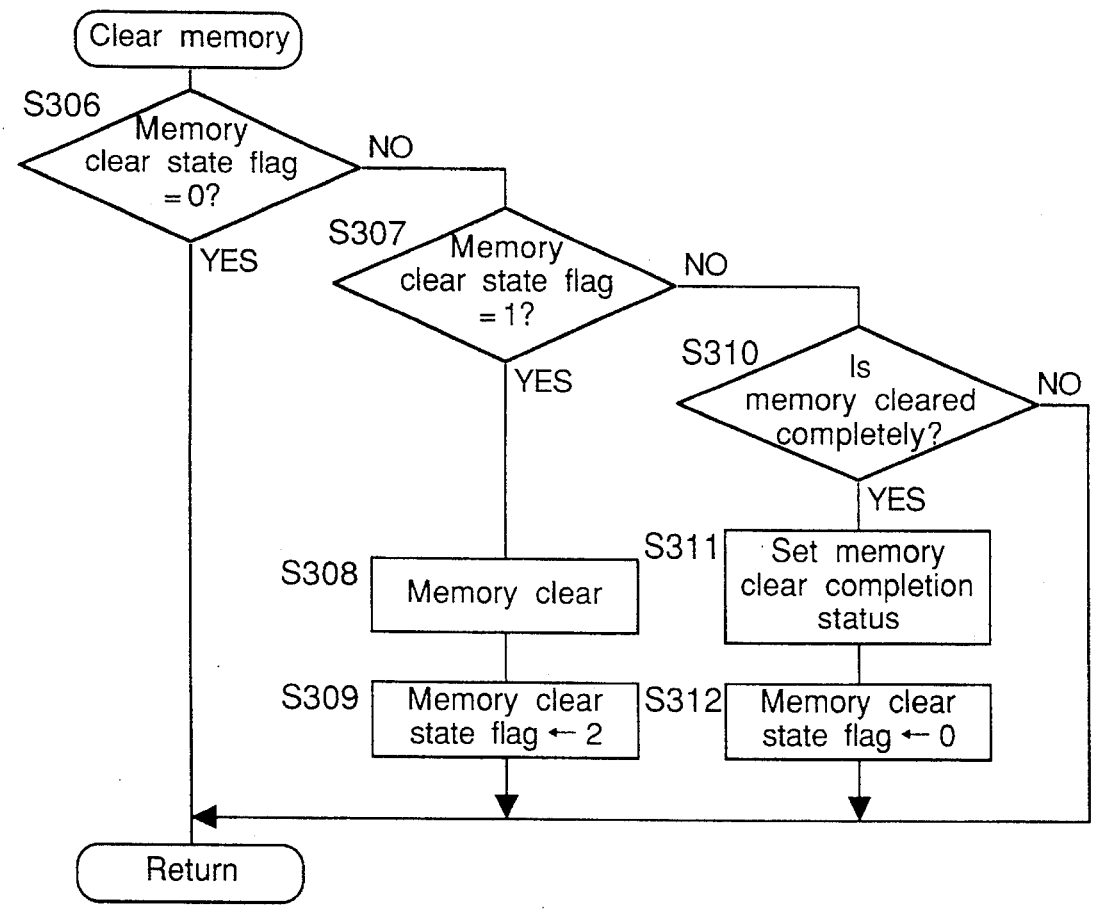
FIG. 21 is a flowchart of memory clear control (step S68 in FIG. 18)

FIG. 21 is a flowchart of the memory clear control (step S68 in FIG. 18). If the memory clear state flag is decided to be "0" (YES at step S306), the flow returns readily to the main flow. If the memory clear state flag is decided to be "1" (YES at step S307), the image memory 304 is cleared by applying a predetermined electric voltage to a reset terminal (not shown) of the image memory 304 (step S308) and the memory clear state flag is set to be "2" (step S309). If memory clear is decided to be completed (YES at step S310), a memory clear completion status is set (step S311) and the memory clear state flag is set to be "0" (step S312).

Figure 22:
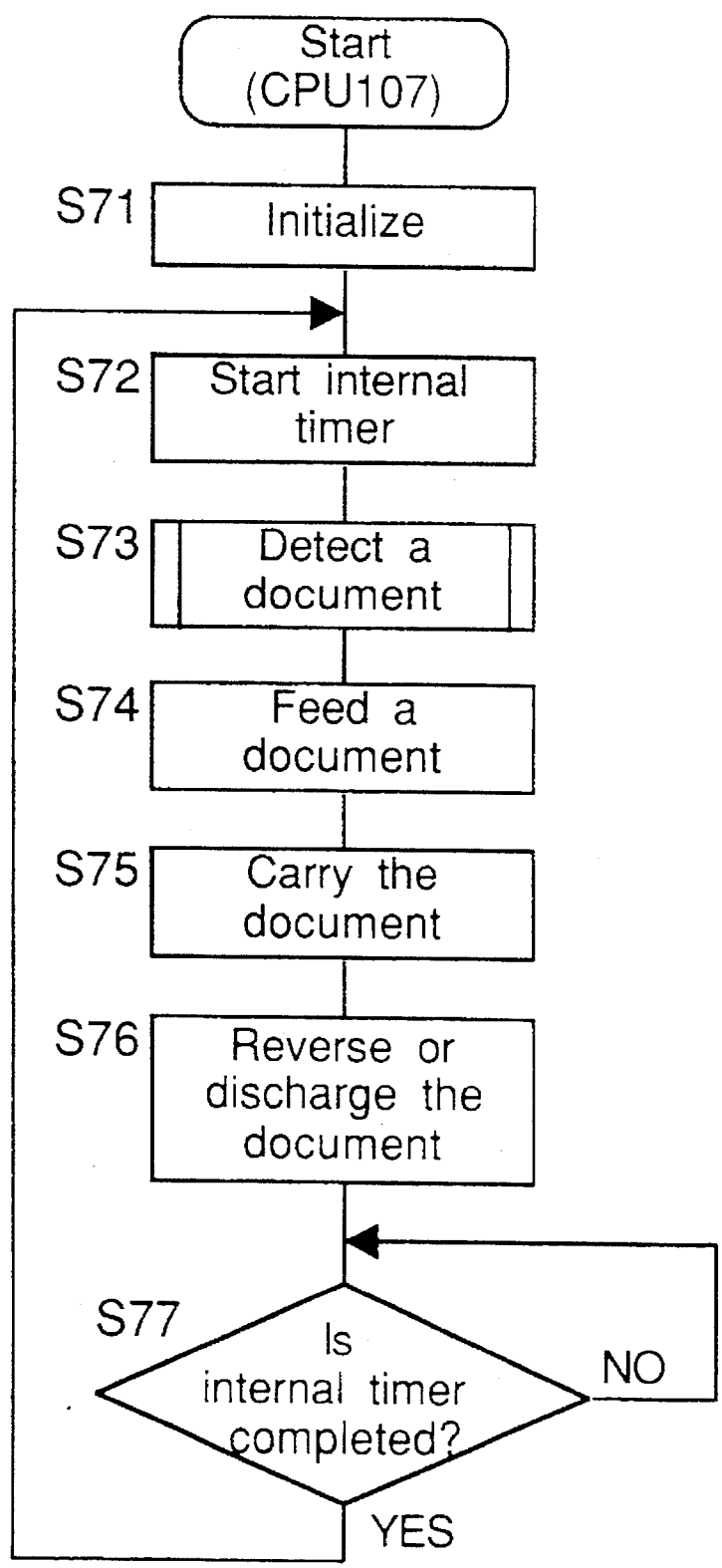
FIG. 22 is a main flowchart of CPU 107.

FIG. 22 is a flowchart of the main routine of the CPU 107 which controls the document feeder 500. After the initialization of various values (step S71), an internal timer is started (step S72). Next, a document in the document feeder 500 is detected to be set or removed (step S73). A document is fed to the feed belt 506 (step S74), and the document is positioned at a predetermined read position and it is carried to the reverse roller 507 (step S75). Then, the document is discharged directly or carried again to the feed belt 506 for reversal (step S76). Finally, it is waited that the internal timer is completed (step S77) in order to make the processing time of the routine constant.

Figure 23:
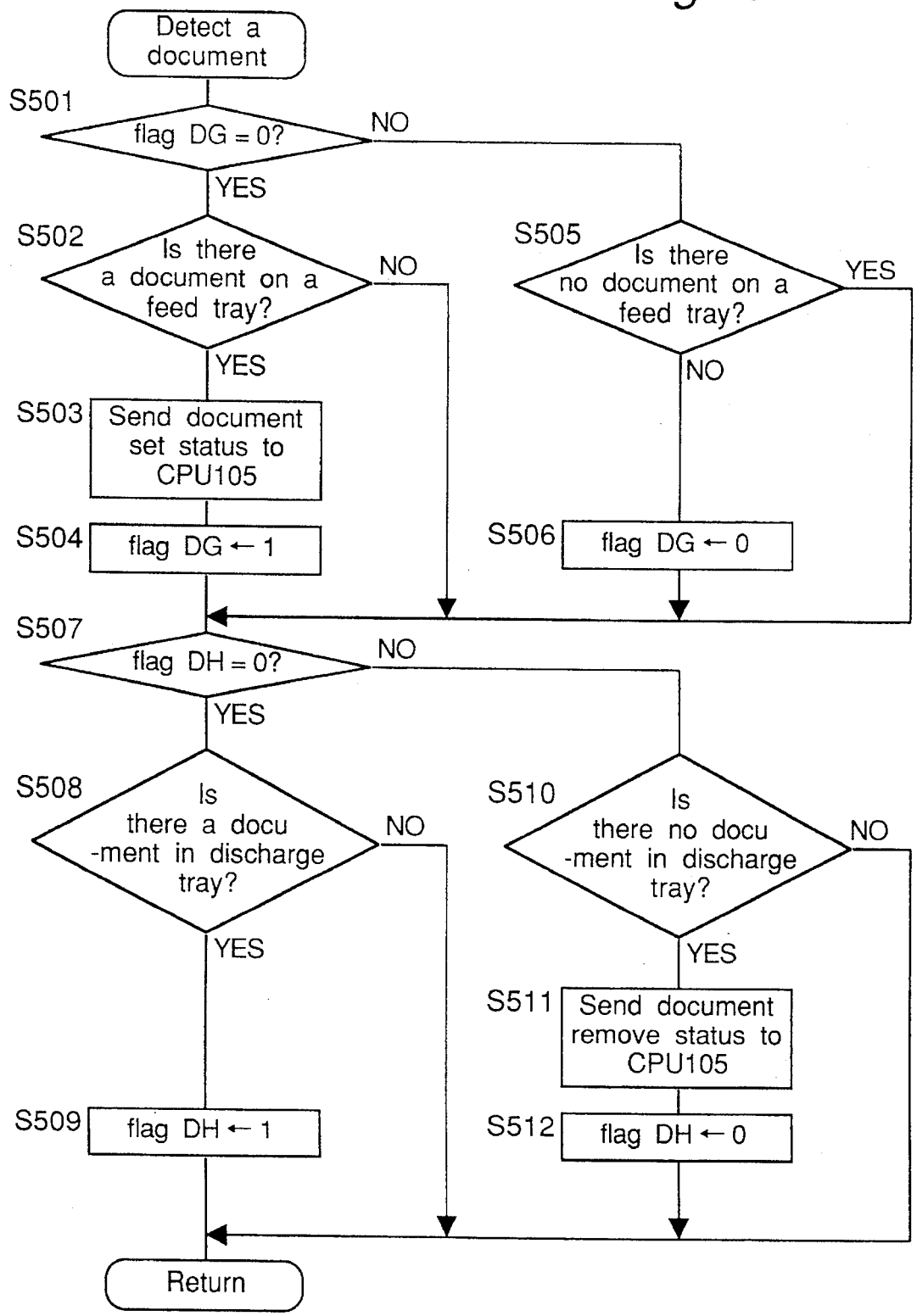
FIG. 23 is a flowchart of document detection (step S73 in FIG. 22)

FIG. 23 is a flowchart of the document detection (step S73 in FIG. 22). First, the set of a document in the document feeder 500 is processed. If a document flag DG on the existence of a document to be fed is decided to be "0" (YES at step S501), it is decided next if there is a document on the document feed tray 510 with the sensor SE53. If the document feed tray 510 is found to change from a state without documents to the other state with documents (YES at step S502), a document set status for the document feeder 500 is sent to the CPU 105 (step S503), and the flag DG is set to be "1" (step S504). When the flag DG is decided to be "1" (NO at step S501), if the document feed tray 510 is found to change from a state with documents to the other state without documents (NO at step S505), the flag DG is reset to be "0" (step S506).

Next, the removal of a document from the document feeder 500 is processed. If a flag DH on the discharge of a document is decided to be "0" (YES at step S507), it is decided next if there is a document on the discharge tray 511 with the sensor SE54. If the discharge tray 511 is found to change from a state without documents to the other state with documents (YES at step S508), a discharge document flag DH is set to be "1" (step S509). When the flag DH is decided to be "1" (NO at step S507), if the discharge tray 511 is found to change from a state with documents to the other state without documents (YES at step S510), a document remove status for the document feeder 500 is sent to the CPU 105 (step S511), and the flag DH is reset to be "0" (step S512).

Figure 24:
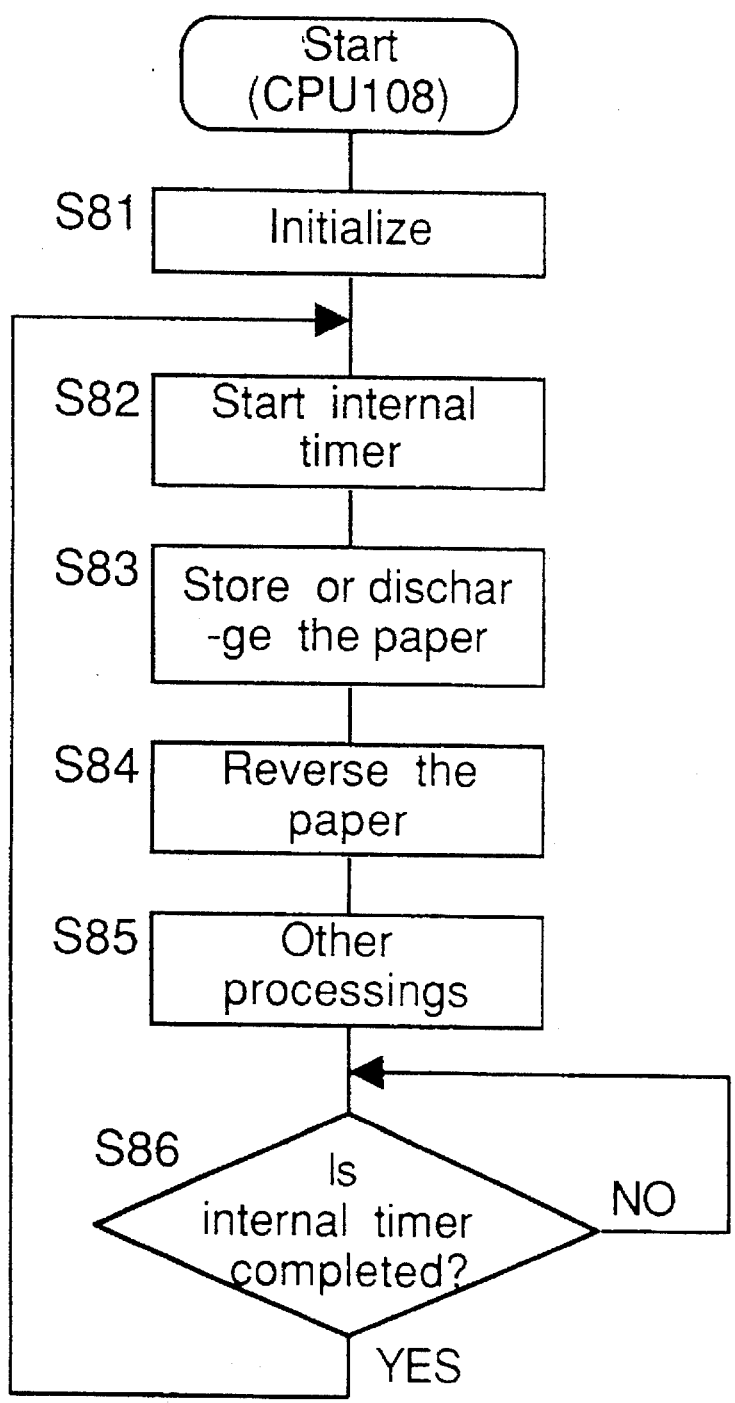
FIG. 24 is a main flowchart of CPU 108.

FIG. 24 is a main flowchart of CPU 108 which controls the re-feed unit 601. After the initialization of various values (step S81), an internal timer is started (step S82). Next, a document is stored once for printing the rear side of a sheet of paper already printed in the image forming system 70 or discharged readily to the discharge tray 621 (step S83). The discharge is detected with the discharge sensor SE62, and the feed roller 602 is stopped when a predetermined time passes after the detection of the discharge. In the former case, the sheet is reversed next (step S84). The reverse roller 603 is rotated normally while the reverse sensor SE61 detects a sheet of paper, and the reverse roller 603 is rotated reversely when the reverse sensor SE61 does not detect the sheet and is stopped after a certain time passes. Then, other processings are performed (step S85). Finally, it is waited that the internal timer is completed (step S86) in order to make the processing time of the routine constant.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A digital image forming apparatus comprising:

a read means for reading an image of a document;

a document set means for setting a document at a prescribed reading position;

a memory means for storing data of the image read by said read means;

an image forming means for forming the image on a sheet of paper according to the data stored in said memory means;

a detection means for detecting whether or not the document is at the prescribed reading position;

determining means for determining if the document is removed from the prescribed reading position; and a clear means for automatically clearing the image data stored in said memory means when the determining means determines that the document has been removed from the prescribed reading position after said detection means detects that the document is at the prescribed reading position.

2. The digital image forming apparatus according to claim 1, further comprising:

a decision means for deciding if said image forming means is currently forming an image; and a means for inhibiting said clear means from clearing the image data when said decision means decides that said image forming means is currently forming an image.

3. The digital image forming apparatus according to claim 1, wherein said document set means includes a document supporting means which comprises a platen on which the document is set for reading by said read means and said detection means detects the document on the platen.

4. The digital image forming apparatus according to claim 1, wherein said document set means comprises:

a feed tray for holding the document;

a feed means for feeding the document on the feed tray to the prescribed position at which said read means reads the document;

a discharge means for carrying the document from the prescribed position; and a discharge tray for receiving the document carried by said discharge means.

5. The digital image forming apparatus according to claim 4, wherein said detection means detects removal of the document from the prescribed position by detecting an existence of the document in said discharge tray.

6. The digital image forming apparatus according to claim 1, wherein said memory means includes a reset terminal and said clear means clears said memory means by applying a voltage to the reset terminal.

7. A digital image forming apparatus comprising:

a read means for reading an image of a document;

a document set means for setting the document at a reading position;

a memory means for storing the image data read by said read means;

an image forming means for forming an image on a sheet of paper according to the data stored in said memory means;

a detection means for detecting whether or not any document is at the reading position; and a clear means for automatically clearing the image data stored in said memory means when the detection means detects that a new document is at the reading position.

8. The digital image forming apparatus according to claim 7, further comprising:

a decision means for deciding if said image forming means is currently forming an image; and a means for inhibiting said clear means from clearing the image data when said decision means decides that said image forming means is currently forming an image.

9. The digital image forming apparatus according to claim 7, wherein said document set means includes a document supporting means which comprises a platen on which the document is set for reading by said read means and said detection means detects the document on the platen.

10. The digital image forming apparatus according to claim 7, wherein said document set means comprises:

a feed tray for holding the document;

a feed means for feeding the document on the feed tray to the position at which said read means reads the document;

a discharge means for carrying the document from the position; and a discharge tray for receiving the document carried by said feed means.

11. The digital image forming apparatus according to claim 10, wherein said detection means detects the setting of the document by detecting the existence of the document in said discharge tray.

12. The digital image forming apparatus according to claim 7, wherein said memory means includes a reset terminal and said clear means clears said memory means by applying a voltage to the reset terminal.

13. A digital image forming apparatus comprising:

a read means for reading an image of a document;

a document set means for setting the document at a reading position;

a memory means for storing the image data read by said read means;

an image forming means for forming an image on a sheet of paper according to the data stored in said memory means;

a detection means for detecting whether or not the document is at the reading position;

determining means for determining if the document is removed from the prescribed reading position; and a first clear means for clearing the image data stored in said memory means when the determining means determines that the document has been removed from the reading position;

a second clear means for clearing the image data stored in said memory means when the detection means detects that a new document is at the reading position; and a selection means for selecting one of said first clear means and said second clear means.

14. The digital image forming apparatus according to claim 13, further comprising:

a decision means for deciding if said image forming means is currently forming an image; and a means for inhibiting the operation of said clear means when said decision means decides that said image forming means is currently forming an image.

15. A digital image forming apparatus comprising:

a read means for reading an image of a document;

a document set means for setting a document at a reading position;

a memory means for storing data of the image read by said read means;

an image forming means for forming the image on a sheet of paper according to the data stored in said memory means;

a detection means for detecting whether or not the document is at a prescribed position;

determining means for determining if the document is removed from the prescribed position; and a clear means for automatically clearing the image data stored in said memory means when the determining means determines that the document has been removed from the prescribed position after said detection means detects that the document is at the prescribed position.

16. The digital image forming apparatus according to claim 15, further comprising:

a decision means for deciding if said image forming means is currently forming an image; and a means for inhibiting said clear means from clearing the image data when said decision means decides that said image forming means is currently forming an image.

17. The digital image forming apparatus according to claim 15, wherein said document set means comprises:

a feed tray for holding the document;

a feed means for feeding the document on the feed tray to the reading position at which position said read means reads the document;

a discharge means for carrying the document from the reading position; and a discharge tray for receiving the document carried by said discharge means.

18. The digital image forming apparatus according to claim 15, wherein said memory means includes a reset terminal and said clear means clears said memory means by applying a voltage to the reset terminal.

19. A digital image forming apparatus comprising:

a read means for reading an image of a document;

a document set means for setting the document at a reading position;

a memory means for storing the image data read by said read means;

an image forming means for forming an image on a sheet of paper according to the data stored in said memory means;

a detection means for detecting whether or not any document is at a prescribed position; and a clear means for automatically clearing the image data stored in said memory means when the detection means detects that a new document is at the prescribed position.

20. The digital image forming apparatus according to claim 19, further comprising:

a decision means for deciding if said image forming means is currently forming an image; and a means for inhibiting said clear means from clearing the image data when said decision means decides that said image forming means is currently forming an image.

21. The digital image forming apparatus according to claim 19, wherein said document set means comprises:

a feed tray for holding the document;

a feed means for feeding the document on the feed tray to the reading position at which position said read means reads the document;

a discharge means for carrying the document from the reading position; and a discharge tray for receiving the document carried by said feed means.

22. The digital image forming apparatus according to claim 19, wherein said memory means includes a reset terminal and said clear means clears said memory means by applying a voltage to the reset terminal.

23. A digital image forming apparatus comprising:

a read means for reading an image of a document;

a document set means for setting the document at a reading position;

a memory means for storing the image data read by said read means;

an image forming means for forming an image on a sheet of paper according to the data stored in said memory means;

a detection means for detecting whether or not the document is at a prescribed position;

determining means for determining if the document is removed from the prescribed position; and a first clear means for clearing the image data stored in said memory means when the determining means determines that the document has been removed from the prescribed position;

a second clear means for clearing the image data stored in said memory means when the detection means detects that a new document is at the prescribed position; and a selection means for selecting one of said first clear means and said second clear means.

24. The digital image forming apparatus according to claim 23, further comprising:

a decision means for deciding if said image forming means is currently forming an image; and a means for inhibiting the operation of said clear means when said decision means decides that said image forming means is currently forming an image.

* * * * *